US012571305B2

(12) United States Patent
Samuel et al.

(10) Patent No.: US 12,571,305 B2
(45) Date of Patent: Mar. 10, 2026

(54) CALCULATING BOREHOLE STABILITY INDEX FOR DRILLING OPERATIONS

(71) Applicant: Landmark Graphics Corporation, Houston, TX (US)

(72) Inventors: Robello Samuel, Houston, TX (US); Tunc Burak, Houston, TX (US); Yongfeng Kang, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 39 days.

(21) Appl. No.: 18/636,742

(22) Filed: Apr. 16, 2024

(65) Prior Publication Data

US 2025/0320812 A1     Oct. 16, 2025

(51) Int. Cl.
*E21B 49/00*          (2006.01)
*E21B 47/04*          (2012.01)
(Continued)

(52) U.S. Cl.
CPC ............ *E21B 49/003* (2013.01); *E21B 47/04* (2013.01); *E21B 47/00* (2013.01); *E21B 49/005* (2013.01);
(Continued)

(58) Field of Classification Search
USPC ............................................................. 702/6
See application file for complete search history.

(56) References Cited

U.S. PATENT DOCUMENTS 5,574,374 A * 11/1996 Thompson ............... G01V 3/28
                                                      702/9
8,818,779 B2   8/2014 Sadlier et al.
(Continued)

FOREIGN PATENT DOCUMENTS

| CN | 115935657 A | 4/2023 |
| WO | 2024072490 A1 | 4/2024 |

OTHER PUBLICATIONS

Skea, et al.; "An approach for wellbore failure analysis using rock cavings and image processing"; Journal of Rock Mechanics and Geotechnical Engineering 10 (2018) 865e878; http://www.rockgeotech.org; 14 pages.

(Continued)

*Primary Examiner* — Paul D Lee
(74) *Attorney, Agent, or Firm* — Michael Jenney; Parker Justiss, P.C.

(57)                    ABSTRACT

A borehole stability index can be determined by using received user inputs and received subterranean formation characteristics. The portion of the subterranean formation characteristics that represent the rock stresses can be transformed to a coordinate system, such as a cylindrical system. Subterranean formation parameters can be calculated from the transformed characteristics. A lithology-specific algorithm can be applied to the subterranean formation parameters to generate a borehole stability index. The borehole stability analysis can then be performed using the subterranean formation parameters. The borehole stability analysis can be performed at incremental radial distance layers into the subterrane formation from a borehole wall. The borehole stability analysis can be performed at various measured depth layers within a measured depth interval of the borehole where the borehole stability index is the algorithmic combination of the individual calculated borehole stability indexes at each measured depth layer.

25 Claims, 12 Drawing Sheets

(51) Int. Cl.
  *E21B 47/00*          (2012.01)
  *G01V 20/00*          (2024.01)

(52) U.S. Cl.
  CPC ......... *E21B 49/006* (2013.01); *E21B 2200/20* (2020.05); *G01V 20/00* (2024.01)

(56)             References Cited

U.S. PATENT DOCUMENTS

| | | | |
|---|---|---|---|
| 11,326,447 | B2 | 5/2022 | Khan |
| 2010/0121623 | A1* | 5/2010 | Yogeswaren .......... G01V 1/284 |
| | | | 703/2 |
| 2013/0275099 | A1* | 10/2013 | Frydman ................ E21B 47/10 |
| | | | 703/2 |
| 2020/0355063 | A1 | 11/2020 | Van Vliet et al. |
| 2021/0017857 | A1 | 1/2021 | Khan |
| 2021/0332694 | A1 | 10/2021 | Wessling et al. |
| 2022/0243575 | A1* | 8/2022 | Kristensen .............. G06F 30/28 |
| 2022/0333477 | A1* | 10/2022 | Kalyanraman ....... E21B 47/005 |
| 2023/0184992 | A1 | 6/2023 | Albahrani et al. |
| 2023/0203937 | A1 | 6/2023 | Guo et al. |
| 2023/0266500 | A1 | 8/2023 | Soroush |
| 2025/0003336 | A1* | 1/2025 | Han ........................ E21B 21/08 |

OTHER PUBLICATIONS

Escobar, et al.; "New Approach for Estimating Cavings Volume to Avoid Wellbore Instabilities"; Rock Mechanics for Natural Resources and Infrastructure SBMR 2014—ISRM Specialized Conference 09-13 Sep. 9, 2013, Goiania, Brazil; 8 pages.

Kumar, et al. "Real-time Wellbore Stability Analysis: An Observation from Cavings at Shale Shakers"; Search and Discovery Article #41095; Dec. 10, 2012; 4 pages.

Elyasi, et al.; "Using different rock failure criteria in wellbore stability analysis"; Geomechanics for Energy and the Environment, 2015; Elsevier Ltd.; 7 pages.

* cited by examiner

600

610                      620

| Borehole Operation Factor | uncertainty in the measurement (%) |
|---|---|
| Uniaxial compressive strength | 40 |
| Friction angle | 50 |
| Overburden stress | 15 |
| Minimum horizontal stress | 30 |
| Maximum horizontal stress | 40 |
| Pore pressure | 40 |
| Mud weight | 5 |
| Maximum horizontal stress direction | 30 |
| Inclination and azimuth | 5 |
| Poissons' ratio | 20 |

FIG. 6

CALCULATING BOREHOLE STABILITY INDEX FOR DRILLING OPERATIONS

TECHNICAL FIELD

This application is directed, in general, to calculating borehole stability and, more specifically, to computing a borehole stability index considering data uncertainty.

BACKGROUND

When drilling a borehole, many potential problems can be encountered. Each of these problems needs to be monitored, measured, and reacted to appropriately to improve the efficiency of the drilling operations while ensuring safety. The stability of the borehole can be affected by many different factors. Each of these factors can have uncertainty in the measurement or uncertainty in the impact of the factor on the borehole operations. Being able to understand that uncertainty and communicate that uncertainty can be helpful in improving borehole operation efficiency.

BRIEF DESCRIPTION

Reference is now made to the following descriptions taken in conjunction with the accompanying drawings, in which:

FIG. 6 is an illustration of a chart of example uncertainty values;

DETAILED DESCRIPTION

Figure 1:
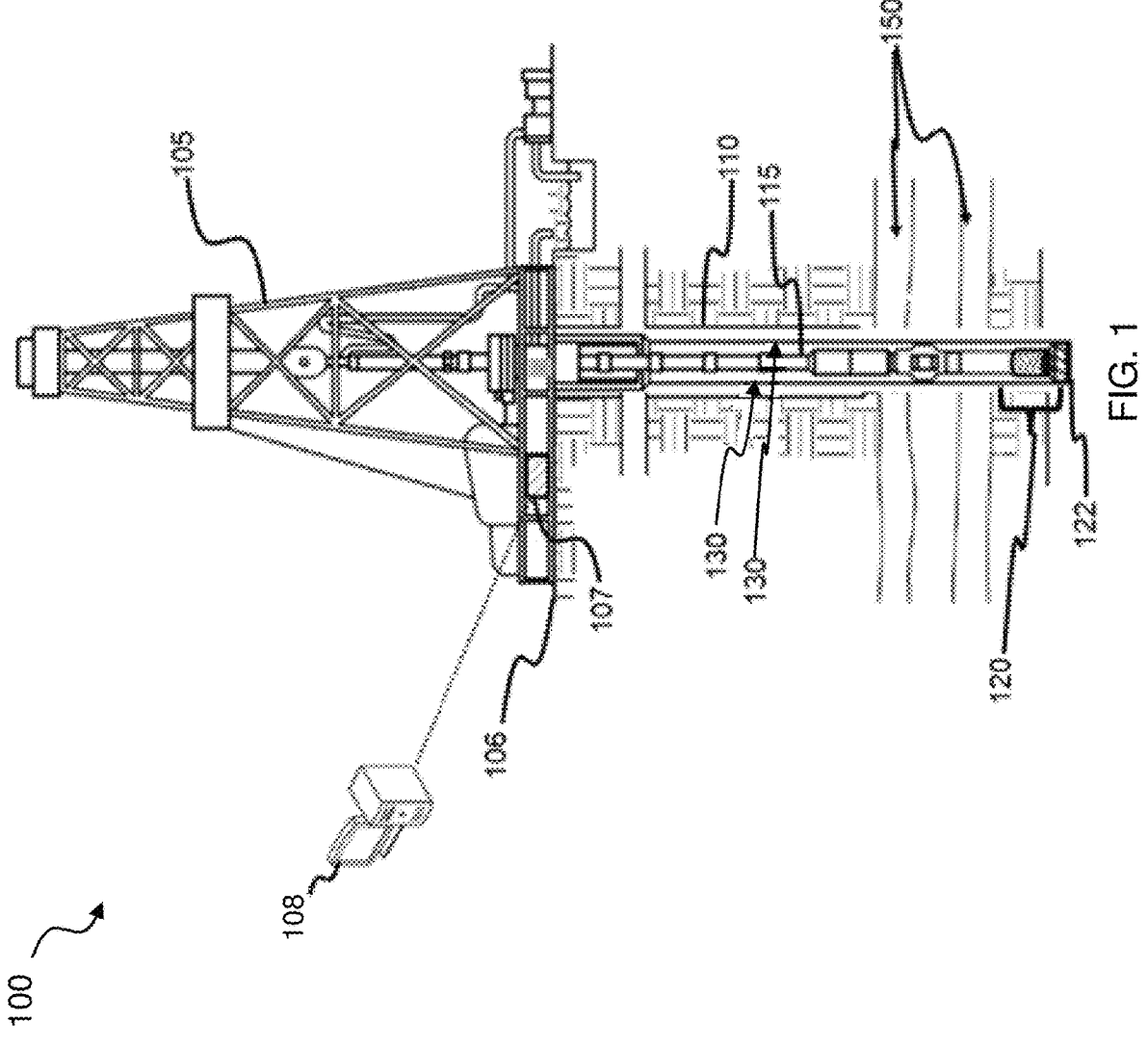
FIG. 1 is an illustration of a diagram of an example drilling system drilling along a planned borehole path.

In developing a well system, a borehole path can be planned through a subterranean formation. Difficulty can arise in planning the intended borehole path relative to features of the subterranean formation while minimizing borehole stability issues. Borehole instability can result in various types of borehole operation inefficiencies. For example, during drilling operations, caving, excess drilling cuttings, sediment buildup, reservoir leakage, and other issues can occur. These issues can utilize one or more remediations to reduce or resolve the issue, such as hole-cleaning operations, unsticking a stuck drill string, repairing casing, or other remediations that can improve the efficiency of operations of the borehole. Reservoirs, strata, sedimentary layers, stratigraphic layers, faults, geophysical characteristics, and other subterranean formation features need to be accounted for when determining the borehole instability.

Operation plans (such as drilling operations, completion operations, extraction operations, intercept operations, hydraulic fracturing (HF), or other borehole operations), e.g., operation parameters, can be adjusted to improve the efficiency of operations through the subterranean formation, such as using a borehole stability index (BSI) to drive the decisions on modifying the operation parameters. For example, when drilling through a specific type of stratigraphic layer, the weight-on-bit (WOB), the rotations per minute (RPM), the angle of drilling, and other drilling parameters, can be adjusted to maximize efficiency. The operation plan can include mud composition parameters, mud weight parameters, drilling fluid parameters, fluid temperature parameters, fluid pressure parameters, and other fluid-related parameters that can be adjusted depending on the conditions downhole to improve the efficiency and safety of the drilling operations, and reduce the impact of potential borehole instability. In other aspects, for an HF borehole, the pressure or composition of the fracturing fluid can be modified in response to a borehole stability index.

Developing the borehole, such as for scientific or hydrocarbon production purposes, can utilize data collected by surface sensors, such as seismic sensors, or downhole sensors, such as sensors located with a drilling system, a drilling assembly, or a bottom hole assembly (BHA) to analyze the borehole to determine a borehole stability index if the current operations are safe to continue. The data can be utilized by various borehole systems. For example, a drilling operation system can use the data to adjust one or more drilling parameters at a rig controller (e.g., WOB, RPM, or other parameters of the drill string), a mud pump or an HF pump (e.g., fluid composition, temperature, pressure, or other parameters of the pumped fluid), a geo-steering system (e.g., direction or angle of drilling, or other parameters), a drill bit assembly, other drilling systems such as a well site controller, a reservoir controller, a computer system, or other systems capable of controlling or directing operations at a well site.

This disclosure demonstrates methods and processes for determining a borehole stability index during an operation of a borehole, such as drilling operations, HF operations, completion operations, extraction operations, or intercept operations. The borehole stability index can take into account the uncertainty of inputs to estimate or predict the borehole stability failure probability through a statistical manner for real-time or near real-time operations. In some aspects, the output of the borehole stability index can be simplified to a three-tier parameter, a critical state, a warning state, and a normal state. In some aspects, more than three tiers can be utilized. Other borehole systems or users can use the output to make adjustments to the borehole operations.

Determining the borehole stability index in real-time or near real-time during borehole operations can provide data to one or more controllers (whether a drilling system, a geo-steering system, a drill bit assembly, a rig controller, a mud pump, an HF pump, a well site controller, a drilling controller, a computing system, or other system capable of directing borehole operations at the borehole) to improve the efficiency of the borehole operations by adjusting operation parameters to reduce the likelihood or impact of borehole instability. This can, for example, reduce hole-cleaning or stuck drill string issues that can occur during drilling operations, reduce the incidence of opening a reservoir during drilling or HF operations when that is not intended, identify the need for casing or to repair/replace casing downhole, or other operation factors. In some aspects, the borehole stability index can be used as an input to another process or system, such as to automatically stop or start an operation using the borehole stability condition. In some aspects, the borehole stability index can be used to infer a cause and to generate a recommendation to mitigate the potential problem detected by the borehole stability index.

In some aspects, improved accuracy in estimating borehole stability indexes can be used to reduce incidences of a stuck pipe issue, due to poor hole cleaning or pack-off problems. In some aspects, the output of this process can be used as an input into other processes, for example, to help determine the amount of overpull force needed on a stuck drill pipe, to determine a pack-off calculation, to determine a modified composition of a drilling mud or an HF fluid, or other borehole operation systems.

The disclosed method and process utilize a lithology-dependent borehole stability model. The analysis can be conducted from the inner surface of the borehole and extending to a specified radius increment of the borehole. For example, a borehole of radius R can have a borehole stability analysis conducted up to 1R, 2R, 3R, 4R, 5R, or other radii increments, e.g., from the inner surface of the borehole extending a radial distance of 3R (or more times, as measured from the center of the borehole) into the subterranean formation.

In some aspects, the analysis can be conducted in iterations, where each iteration uses a radial distance increment of the total radii being analyzed. For example, a radial distance increment can be 0.1R, 0.2R, 0.3R, or another value. In an aspect where the analysis is examining the subterranean formation to a radial distance of 3 times the radius of the borehole, then using a radial distance increment of 0.2R, there would be 10 iterations of calculations and analysis performed (1 iteration at each distance increment of 0.2R, i.e., a radial distance layer, from the radial distance of 1R at the borehole wall to the distance of 3R radially oriented into the subterranean formation). In each iteration, the breakout angle can be calculated from the borehole stability analysis. By leveraging the breakout angle data and a series of radial distance layer-by-layer (each iteration using a distance increment to move to the next radial distance layer) determinations of the BSI, the calculated results can provide timely and improved analysis of borehole conditions, thereby facilitating the implementation of proactive measures. In some aspects, for the purpose of improving the response time, the calculation can apply to the borehole wall and not further into the subterranean formation.

In some aspects, proactive measures can be implemented by a user, for example, directing a change in a drilling parameter or a drilling operation. In some aspects, proactive measures can be implemented by a drilling controller, an HF controller, or other controllers. For example, in some aspects, a mud pump can be directed by the borehole stability system to adjust the fluid composition, temperature, or pressure to reduce the probability of a caving event. In some aspects, a rig controller can be directed to adjust the WOB or RPM. A rig controller can be, for example, a top drive controller that directs a top drive. In some aspects, a geo-steering system can be directed to change an angle of drilling. In some aspects, an HF pump can be directed to change the fluid composition, additives, or pressure. In some aspects, other drilling parameters can be adjusted by one or more other controller types.

The disclosed borehole stability model is correlated to a lithology type and a field type. For example, in aspects where the lithology of the subterranean formation is carbonate, the borehole stability model can apply a Mogi-Coulomb failure criterion. In aspects where the lithology of the subterranean formation is sandstone or shale, the borehole stability model can apply a Mohr-Coulomb failure criterion. Other failure criteria can be utilized with other types of lithologies.

Each iteration of the borehole stability analysis can utilize two segments. In the first segment, the transformation of stress can be performed. This can involve utilizing one or more vertical stress parameters, minimum and maximum horizontal stress parameters, real-time inclination and azimuth parameters, or an orientation of the maximum horizontal stress parameter. In some aspects, the globally measured stress data can be translated into a Cartesian coordinate system, which can then be converted to a cylindrical coordinate system. Subsequently, the stresses around the borehole can be determined using Kirsch equations. A notable aspect of this model is the ability to calculate stresses several times the radius away from the center of the borehole. In some aspects, to calculate the principal stress, pore pressure multiplied by Biot's coefficient can be subtracted from the stress around the borehole since poroelastic analysis is being used.

The second segment can represent the calculation of the subterranean formation parameters. Subterranean formation parameters can be, for example, rock strength, Poisson's ratio, porosity, density, or friction angle. Subterranean formation parameters can be determined from real-time or near real-time data collected at a surface or downhole location, or through established correlations, such as with nearby boreholes. In some aspects, a lithology-specific parameter calculation can be applied. The determined subterranean formation parameters can be further modified by applying the relevant subterranean formation failure criteria. The borehole stability model can identify and select the failure criteria based on the drilled lithology. For example, when drilling sandstone or shale, the Mohr-Coulomb failure criterion can be applied. When drilling carbonate, the Mogi-Coulomb failure criterion can be applied.

In some aspects, an uncertainty analysis can be performed using the outputs from the first and second segments determined above, by applying the uncertainty of the input parameters to the first and second segments above. Data collected from sensors can have uncertainty for various reasons, and this uncertainty can be captured by the uncertainty analysis and applied to the failure analysis. For example, in some aspects, a Monte Carlo simulation model can be used as the process to determine the uncertainty impact on the failure analysis. In some aspects, other types of uncertainty simulation models can be used to perform the uncertainty analysis. In some aspects, the uncertainty analysis can be applied for each measured depth layer.

In some aspects, the data collected can be adjusted following a distribution of the inputs in accordance with the confidence level of each measurement of the input data. Each iteration of the simulation can utilize one value from this distribution which will then result in a set of simulated borehole stability indexes, that then can be arithmetically combined (using an arithmetic algorithm) to determine the results, e.g., a final borehole stability index through a statistical method.

The uncertainty range of values to utilize for a measurement can vary as to the type of sensor being used, the type of measurement being taken, the specified uncertainty range specified by a user in an input parameter, or combinations thereof. The uncertainty range specifies a plus or minus range using a measurement, a calculated value, or a modeled value for the subterranean formation characteristic as the center value. For example, since mud weight can be measured at a surface location, its uncertainty can be specified as ±5%, whereas a downhole measurement, such as the friction angle of the subterranean formation can be specified as ±50%. Other values can be specified for these or other measurements, for example, see FIG. 6. The range can utilize inclusive endpoints, exclusive endpoints, or a combination thereof.

For each range that is determined for a factor, another parameter can specify an interval to use within that range. The interval parameter can be a default value, specified by a user, or provided as an input parameter. The interval parameter specified the step value to use from one end of the range to the other end of the range. For example, for a range that has been determined to be 30 to 70, the interval can be a step of 1, 5, 10, or other values, such as 0.5, or other decimal or whole values. The size of the range and the size of the interval can be modified to provide an improvement to the simulated results of the borehole stability index. For example, a total of 5 simulation iterations can be used, or a total of 20, 100, 400, or more simulation iterations can be used. The number of simulation iterations is not restricted by the disclosed processes. The number of simulation iterations is restricted by the amount of processing power available and how quickly it is desired for the results to be returned. In some aspects, an approximate target of 400 simulation iterations can be an optimum number of simulation iterations.

In some aspects, the disclosure can perform the borehole stability analysis at specified measured depth layers (e.g., measured borehole depths) to calculate the borehole stability index or probability measured depth layer by measured depth layer. At each measured depth layer, the iterative analysis is conducted for each radial distance increment as measured from the center of the borehole. This analysis can start at a specified measured borehole depth and then iterate through each measured depth layer increment until the analysis ends. The starting measured borehole depth to the ending measured borehole depth is a measured depth interval. The process can use a measured depth increment to determine the size of change between each measured depth layer, such as using one inch, one foot, or other measured depth values.

At each measured depth layer, the break angle can be calculated utilizing the in-situ stress status and the failure criteria to improve the calculations at that measured depth layer. In some aspects, the calculation of the borehole stability index can stop at a radial distance layer where the break-out angle results in a zero (0) borehole stability index, which means that there is no further impact from the analyzed operation. In some aspects, the analysis can end when a specified radial distance is reached. In some aspects, the analysis can end when the borehole operation plan so specifies. In some aspects, the analysis can stop when a specified measured depth layer is reached or exceeded. Then the borehole stability result previously calculated for each simulation iteration at each radial distance layer into the subterranean formation for each measured depth layer in the measured depth interval can be arithmetically combined to obtain the combined borehole stability index for that measured depth interval, such as using a Monte Carlo simulation.

In determining the subterranean formation stresses and transformations, conventional methods can be used. For example, the following conventional equations can be utilized. Since these are conventional equations, further explanations can be found in Li, et al in the references.

Conventional stress transformations

Equation Set 1

$$\sigma_x = \left(\sigma_H \cos^2 \alpha + \sigma_h \cos^2 \alpha\right)\cos^2 i + \sigma_v \sin^2 i$$

$$\sigma_y = \sigma_H \sin^2 \alpha + \sigma_h \cos^2 \alpha$$

$$\sigma_z = \left(\sigma_H \cos^2 \alpha + \sigma_h \sin^2 \alpha\right)\sin^2 i + \sigma_v \cos^2 i$$

$$\sigma_{xy} = \frac{1}{2}(\sigma_h - \sigma_H)\sin 2\alpha$$

$$\sigma_{yz} = \frac{1}{2}(\sigma_h - \sigma_H)\sin 2\alpha$$

$$\sigma_{xz} = \frac{1}{2}\left(\sigma_H \cos^2 \alpha + \sigma_h * \sin^2 \alpha - \sigma_v\right)\sin 2i$$

where:

$\sigma_H$ is the maximum horizontal principal stress,
$\sigma_h$ is the minimum horizontal principal stress,
$\sigma_v$ is the vertical principal stress,
$\sigma_x$ is the normal stress along the x-axis,
$\sigma_y$ is the normal stress along the y-axis,
$\sigma_z$ is the normal stress along the z-axis,
$\sigma_{xy}$ is the shear stress on the x-plane along the y-direction,
$\sigma_{yz}$ is the shear stress on the y-plane along the z-direction,
$\sigma_{xz}$ is the shear stress on the x-plane along the z-direction,
$\alpha$ is the drilling direction with respect to $\sigma_H$, and
i is the well inclination angle.

The following equations can be used to calculate the stresses around the vicinity of the borehole and up to n times of radii away from the center point of the borehole into the subterranean formation radially. In some aspects, the analysis can be performed using stresses that are calculated for each theta ($\theta$) angle of 0.0 to 180.0 degrees (e.g., a restricted set of angles). To decrease computational resources, stresses can be calculated from 0.0 to 180.0 degrees, and apply direct symmetry on the opposite side of the borehole.

Calculating stresses at a radial distance layer for

Equation Set 2 a radius $r$ from the well center in the formation $$\sigma_r = \frac{\sigma_x + \sigma_y}{2}\left(1 - \frac{R^2}{r^2}\right) +$$

$$\frac{\sigma_x - \sigma_y}{2}\left(1 - \frac{4R^2}{r^2} + \frac{3R^4}{r^4}\right)\cos 2\theta + \sigma_{xy}\left(1 - \frac{4R^2}{r^2} + \frac{3R^4}{r^4}\right)\sin 2\theta + \frac{P_w R^2}{r^2}$$

$$\sigma_\theta = \frac{\sigma_x + \sigma_y}{2}\left(1 + \frac{R^2}{r^2}\right) - \frac{\sigma_x - \sigma_y}{2}\left(1 + \frac{3R^4}{r^4}\right)\cos 2\theta -$$

$$\sigma_{xy}\left(1 + \frac{3R^4}{r^4}\right)\sin 2\theta - \frac{P_w R^2}{r^2}$$

$$\sigma_z = \sigma_z^0 - 2v(\sigma_x - \sigma_y)\frac{R^2}{r^2}\cos 2\theta - 4v\sigma_{xy}\frac{R^2}{r^2}\sin 2\theta$$

$$\tau_{r\theta} = \left(\frac{\sigma_x - \sigma_y}{2}\sin 2\theta + \sigma_{xy}\cos 2\theta\right)\left(1 + \frac{2R^2}{r^2} - \frac{3R^4}{r^4}\right)$$

7                                                                                                  8

-continued $$\tau_{rz} = (\sigma_{yz}\sin\theta + \sigma_{xz}\cos\theta)\left(1 - \frac{R^2}{r^2}\right)$$

$$\tau_{\theta z} = (-\sigma_{xz}\sin\theta + \sigma_{yz}\cos\theta)\left(1 + \frac{R^2}{r^2}\right)$$

where:

$\sigma_r$ is the radial stress in the near field, $\sigma_\theta$ is the tangential stress in the near field, $\sigma_z$ is the axial stress in the near field along the well axis, $\tau_{r\theta}$ is the shear stress on the r-plane along the $\theta$-direction, $\tau_{rz}$ is the shear stress on the r-plane along the z-direction, $\tau_{\theta z}$ is the shear stress on the $\theta$-plane along the z-direction, $\sigma_x$ is the normal stress along the x-axis, $\sigma_y$ is the normal stress along the y-axis, $\sigma_z^0$ is the normal stress along the z-axis, $\sigma_{xy}$ is the shear stress on the x-plane along the y-direction, $\sigma_{yz}$ is the shear stress on the y-plane along the z-direction, $\sigma_{xz}$ is the shear stress on the x-plane along the z-direction, R is the radius of the borehole, r is the radial distance in the near field from the well center, $\theta$ is the angle measured clockwise from the x-axis, $P_w$ is the pressure in the borehole, and v is Poisson's ratio.

To calculate the in-situ stresses from the borehole wall (1 radius from the center of the borehole) to the specified radial distance into the subterranean formation (n times the radius of the borehole, such as 3, 4, or 5), the iteration can change the radial distance analyzed into the subterranean formation by the distance increment, for example, 0.2 of the radius each iteration until the maximum specified distance into the subterranean formation is reached or a 0 break out angle is reached. In some aspects, each iteration can apply the borehole stability analysis by applying the Mogi-Coulomb, Mohr-Coulomb, or other failure criteria (e.g., a lithology-specific algorithm) to the previously calculated stresses.

Applying the Mogi–Coulomb                                    Equation Set 3 failure criterion for carbonate lithology $$\tau_{oct} = a + b * \sigma_{m2}$$

where, $$\tau_{oct} = \frac{1}{3}\sqrt{(\sigma_1 - \sigma_2)^2 + (\sigma_2 - \sigma_3)^2 + (\sigma_1 - \sigma_3)^2}$$

$$\sigma_{m2} = \frac{(\sigma_1 + \sigma_3)}{2}$$

$$a = \frac{2\sqrt{2} * UCS}{3 * (q + 1)} \text{ and } b = \frac{2\sqrt{2} * (q - 1)}{3 * (q + 1)}$$

$$q = \frac{1 + \sin(\text{friction angle})}{1 - \sin(\text{friction angle})}$$

Failure *eqn* $(F) = a + b\sigma_{m2} - \tau_{oct}$ and $F \le 0$ there will be shear failure.

Applying the Mohr–Coulomb                                    Equation Set 4 failure criterion for sandstone or shale lithology $$\sigma_1 = q * \sigma_3 + UCS$$

Failure *eqn* $(F) =$ $q * \sigma_3 + UCS - \sigma_1$ and $F \le 0$ there will be a shear failure.

where, for Equation Set 3 and Equation Set 4:

$\tau_{oct}$ is the octahedral shear stress, $\sigma_{m2}$ is the effective mean stress, $\sigma_1$ is the maximum principal stress, $\sigma_2$ is the intermedia principal stress, $\sigma_3$ is the minimum principal stress, q is the slope of the line relating to $\sigma_1$ and $\sigma_3$, a is the Mogi parameter, b is the Mogi parameter, and UCS is the Uniaxial compressive strength of the formation.

Equation Set 3 and Equation Set 4 can be applied at a measured depth layer, iterating through the radial distance layers from the borehole wall to the specified maximum distance from the well center in a radial direction. This analysis can be performed at more than one measured depth layer within the measured depth interval. To perform this calculation, the breakout angle can be determined in each iteration using Equation Set 3 and 5, or 4 and 5. In some aspects, if not otherwise specified, the distance increment in the radial distance layer-by-layer analysis can be set to one inch. Calculations can be carried out around half of the borehole using direct symmetry to project results for the non-analyzed half of the borehole. Therefore the borehole stability index on one side (radially 180 degrees) can be arithmetically combined to obtain the borehole stability index of the 360-degree region in this measured depth layer.

if $F \le 0$,                                                                 Equation Set 5 then the borehole stability index can be set to 'critical' if $0 < F < 1$, then the borehole stability index can be set to 'warning' if $F \ge 1$, then the borehole stability index can be set to 'normal'

For the simulations, the total number of each 'critical', 'warning', and 'normal' category can be summed up from each simulation with a set of inputs in the uncertainty range, so there can be a statistical possibility result of each category of 'critical', 'warning', and 'normal'. The borehole stability index can be calculated from Equation 6. In some aspects, the BSI value can be calculated in the range of 0.0 to 1.0. In some aspects, the BSI can be calculated as a percentage of possibility in the range of 0.0 to 100.0.

Borehole stability index calculation                                    Equation 6

$$BSI = \frac{n_{critical}}{n_{total}} = \frac{\text{number of critical case reported}}{\text{total number of simulation}}$$

In some aspects, a borehole stability machine learning system can be utilized to perform one or more steps of the analysis. This can achieve an improved predictive performance by training machine learning models to estimate potential borehole stability indexes using the subterranean formation characteristics as input data. In some aspects, the borehole stability machine learning system can be part of a borehole stability analyzer, borehole stability processor, or a borehole controller, such as a drilling system, a rig controller, a drilling controller, a mud pump, an HF pump, a well site controller, a computing system, or other system capable of controlling borehole operations, such as geo-steering system. In some aspects, the borehole stability machine learning system can be part of a computing system located proximate to the borehole, an edge system, a cloud environment, a data center, a laboratory, a server, or a corporate environment.

In some aspects, the borehole stability machine learning system can automatically generate the borehole stability index using the input parameters and communicate the results to another system that can then use that information as input data for its processing, such as to adjust drilling parameters, to adjust mud or HF pumps, or to adjust other borehole operations to reduce borehole instability factors.

Turning now to the figures, FIG. 1 is an illustration of a diagram of an example drilling system 100 drilling along a planned borehole path, for example, a logging while drilling (LWD) system, a measuring while drilling (MWD) system, a seismic while drilling (SWD) system, a telemetry while drilling (TWD) system, injection well system, extraction well system, and other borehole systems. Drilling system 100 includes a derrick 105, a well site controller 107, and a computing system 108. Well site controller 107 includes a processor and a memory and is configured to direct the operation of drilling system 100. Derrick 105 is located at a surface 106.

Extending below derrick 105 is a borehole 110 with downhole tools 120 at the end of a drill string 115. Downhole tools 120 can include various downhole tools, such as a formation tester or a bottom-hole assembly (BHA). Downhole tools 120 can include a seismic tool or an ultra-deep seismic tool. At the bottom of downhole tools 120 is a drilling bit 122. Other components of downhole tools 120 can be present, such as a local power supply (e.g., generators, batteries, or capacitors), telemetry systems, sensors, transceivers, and control systems. Borehole 110 is surrounded by subterranean formation 150.

Well site controller 107 or computing system 108 which can be communicatively coupled to well site controller 107, can be utilized to communicate with downhole tools 120, such as sending and receiving acoustic data, seismic data, telemetry, data, instructions, subterranean formation measurements, and other information. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the processes described herein. Well site operators, engineers, and other personnel can send and receive data, instructions, measurements, and other information by various conventional means, now known or later developed, with computing system 108 or well site controller 107. Well site controller 107 or computing system 108 can communicate with downhole tools 120 using conventional means, now known or later developed, to direct operations of downhole tools 120, e.g., geo-steering operations. Casing 130 can act as barrier between subterranean formation 150 and the fluids and material internal to borehole 110, as well as drill string 115.

In some aspects, sensor data can be collected using sensors located at surface 106. In some aspects, sensor tools can collect sensor data relating to the subterranean formation where the sensor tools are positioned downhole the borehole or a nearby borehole. In some aspects, sensor data can include the subterranean formation characteristics (e.g., characteristics about the stratigraphy, the geology, composition, porosity, density, or other characteristics of the formation). In some aspects, the sensor tools can be seismic sensors, ultra-deep seismic sensors, nuclear magnetic resonance sensors, acoustic sensors, electrical sensors, or other sensor types now known or later developed for borehole use.

In some aspects, a borehole stability analyzer can utilize the sensor data to generate a borehole stability index for each simulation iteration, for each radial distance layer, for each measured depth layer in a measured depth interval, and to calculate a combined borehole stability index. In some aspects, the borehole stability analyzer can communicate the collected data or the results to another system, such as computing system 108 or well site controller 107 where the data can be filtered and analyzed. In some aspects, computing system 108 can be the borehole stability analyzer and can receive the sensor data from one or more of the sensor tools. In some aspects, well site controller 107 can be the borehole stability analyzer and can receive the sensor data from one or more of the sensor tools. In some aspects, the borehole stability analyzer can be partially included with well site controller 107 and partially located with computing system 108.

The borehole stability result output from the borehole stability analyzer can be used to direct operations of drilling system 100, such as to update or modify the planned borehole path, such as communicating to a drilling controller. For example, a drilling controller can be one or more types of controllers or systems at the well site. In some aspects, the drilling controller can be a geo-steering system where directions to downhole tools 120 can include geo-steering instructions so that future drilling operations are along the planned or intended borehole path. In some aspects, the drilling controller can be a mud pump where directions can be communicated to a mud pump at drilling system 100 to modify a drilling fluid parameter, such as modifying a composition, a temperature, or a pressure of the fluid. In some aspects, the drilling controller can be a rig controller where directions can be communicated to a rig controller proximate derrick 105, for example, to modify a WOB or RPM of the drill string. In some aspects, the drilling controller can be a well site controller where directions can be communicated to a well site controller to update a drilling operation plan or modify other drilling operation parameters.

FIG. 1 depicts onshore operations. Those skilled in the art will understand that the disclosure is equally well suited for use in offshore operations. FIG. 1 depicts a specific borehole configuration, those skilled in the art will understand that the disclosure is equally well suited for use in boreholes having other orientations including vertical boreholes, horizontal boreholes, slanted boreholes, multilateral boreholes, and other borehole types.

Figure 2A:
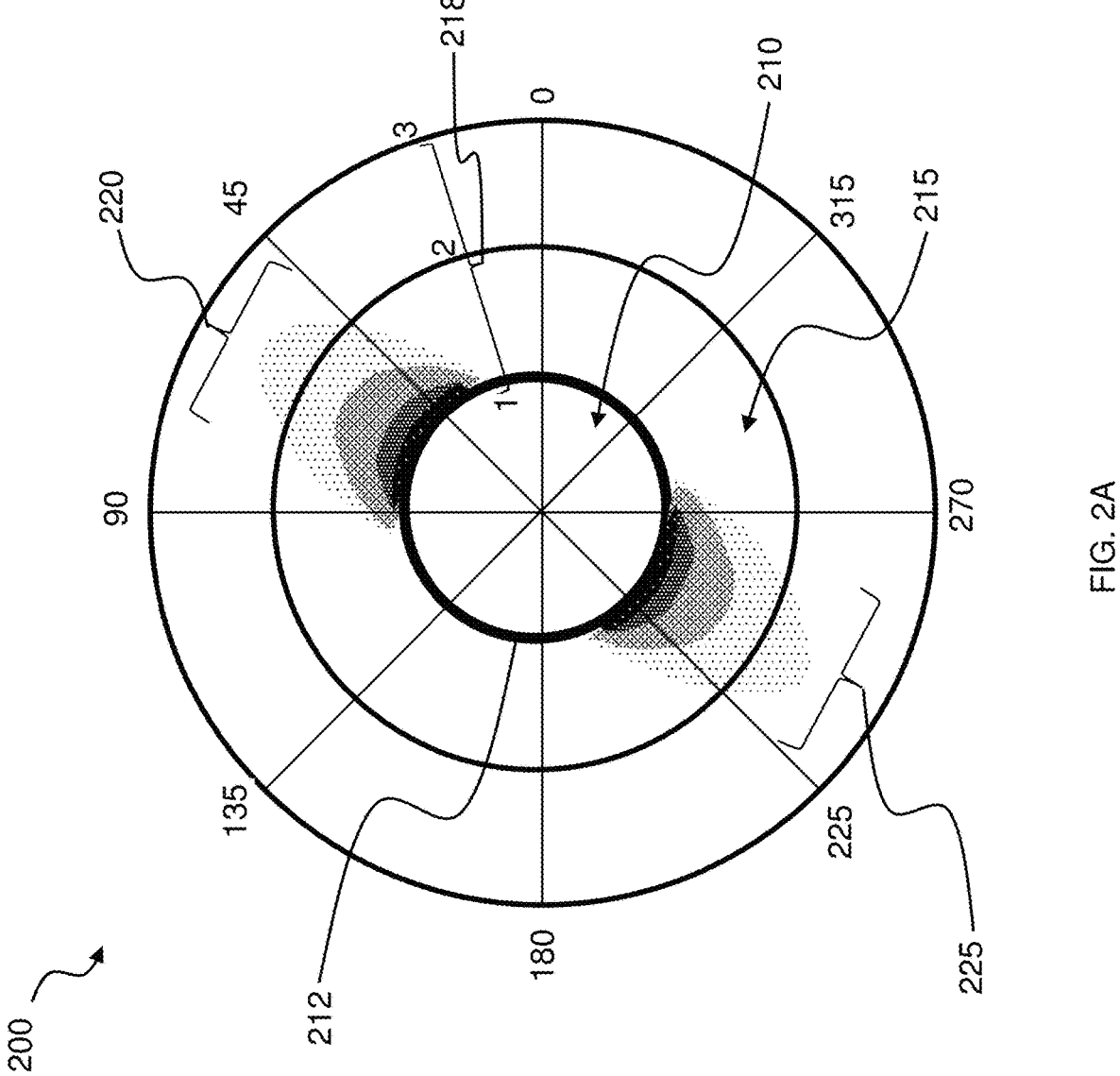
FIG. 2A is an illustration of a diagram of an example radial analysis into a subterranean formation.

FIG. 2A is an illustration of a diagram of an example radial analysis 200 into a subterranean formation. Radial analysis 200 is a top-down view of a borehole 210 showing how the radial distance layer by radial distance layer analysis can be represented using a visual method. Radial analysis 200 shows relative borehole stability indexes that can be calculated in each simulation iteration under a current borehole operation plan. Borehole 210 is surrounded by an inner surface 212 of a subterranean formation 215. In this example, a radius of interest 218 is 3R, meaning the analysis of radial distance layer by radial distance layer is conducted in distance increments extending a distance of 3 times the radius of borehole 210 into subterranean formation 215. The analysis begins at inner surface 212 and ends at a radius of 3R, where R is the radius of the borehole. In some aspects, the analysis can be applied on the inner borehole wall surface for a faster response time.

An arbitrary starting point has been determined to represent the 0° mark on the radial coordinates. The analysis can cover 0.0° to 180.0° radially using the top-down perspective of radial analysis 200. The break-out angle between approximately 30° and 90° of radial analysis 200 can be represented by the borehole stability analysis shown as borehole stability indexes 220. Each radial distance layer of analysis into subterranean formation 215 is shown in a progressively lighter shading, where four radial distance layers are shown for simplicity. Borehole stability indexes 225 are shown as a direct symmetry from borehole stability indexes 220. Borehole stability indexes 225 do not need to be directly calculated, rather they can be determined using direct symmetry.

Figure 2B:
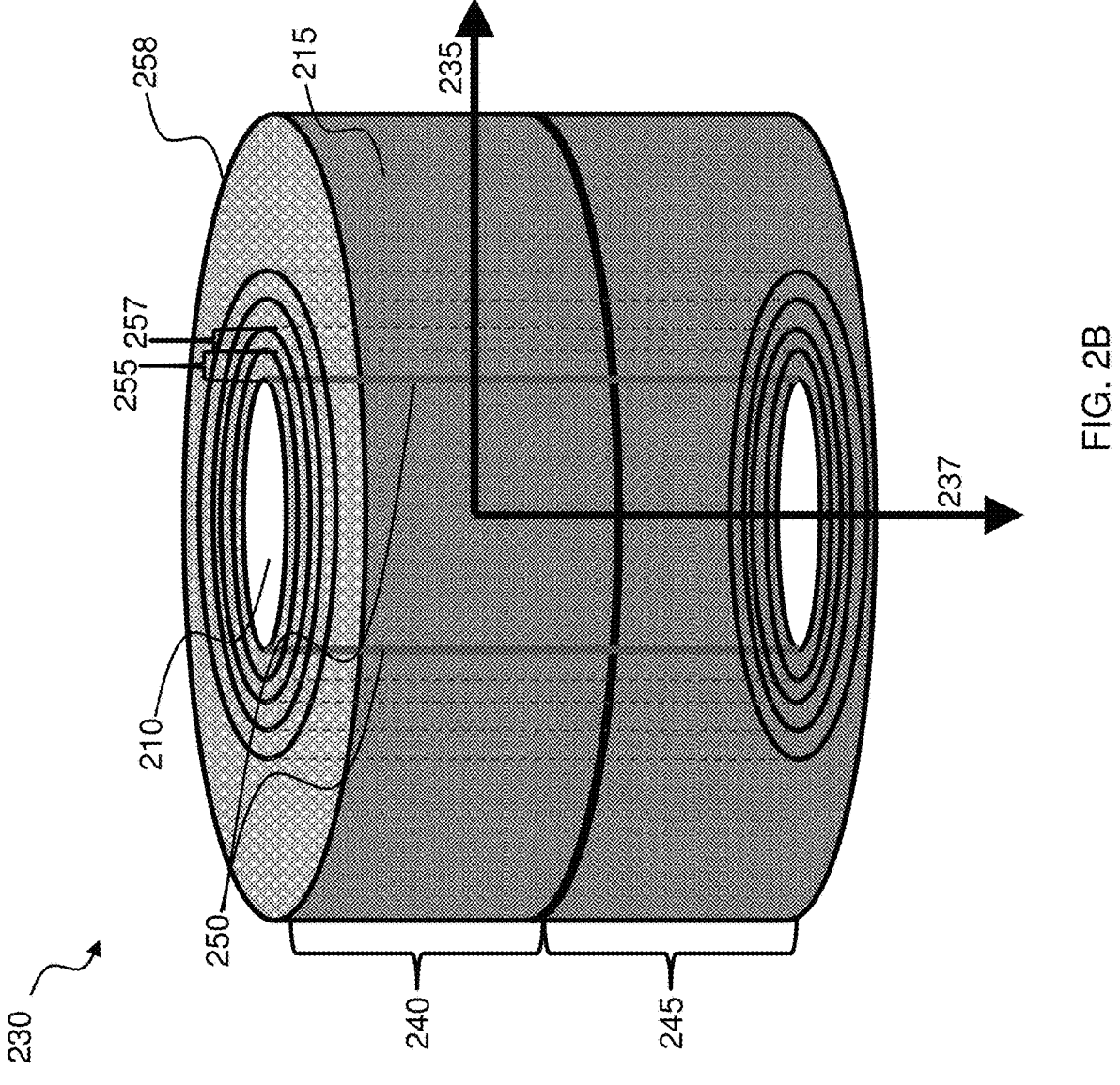
FIG. 2B is an illustration of a diagram of an example three-dimensional (3D) visualization 230 of radial distance layers.

FIG. 2B is an illustration of a diagram of an example three-dimensional (3D) visualization 230 of radial distance layers at two proximate measured depth layers. 3D visualization 230 shows radial analysis 200 oriented vertically using a 3D perspective of subterranean formation 215. 3D visualization shows two measured depth layers, a measured depth layer 240 and a measured depth layer 245. A radial distance vector is shown using vector 235 (i.e., radial axis). A measured depth layer vector is shown by vector 237 (i.e., axial axis). Measured depth layer 240 is a measured depth layer thickness of k, and measured depth layer 245 is a measured depth layer thickness of k+1.

Borehole 210 has a borehole wall 250 (e.g., inner surface) extending through subterranean formation 215. A first radial distance layer 255 is indicated by the area delineated between the two concentric circles. A second radial distance layer 257 is indicated by the area delineated between the larger of the previous concentric circles and one larger concentric circle. First radial distance layer 255 can be the $n^{th}$ distance layer and second radial distance layer 257 can be the $n^{th}+1$ distance layer. The thickness of each of first radial distance layer 255 and second radial distance layer 257, and further radial distance layers, are determined from the radial distance increment parameter, for example, expressed in terms of borehole 210 radius R, (e.g., 0.2R). An outer boundary 258 is shown, such as being 3R, or another specified value.

Figure 2C:
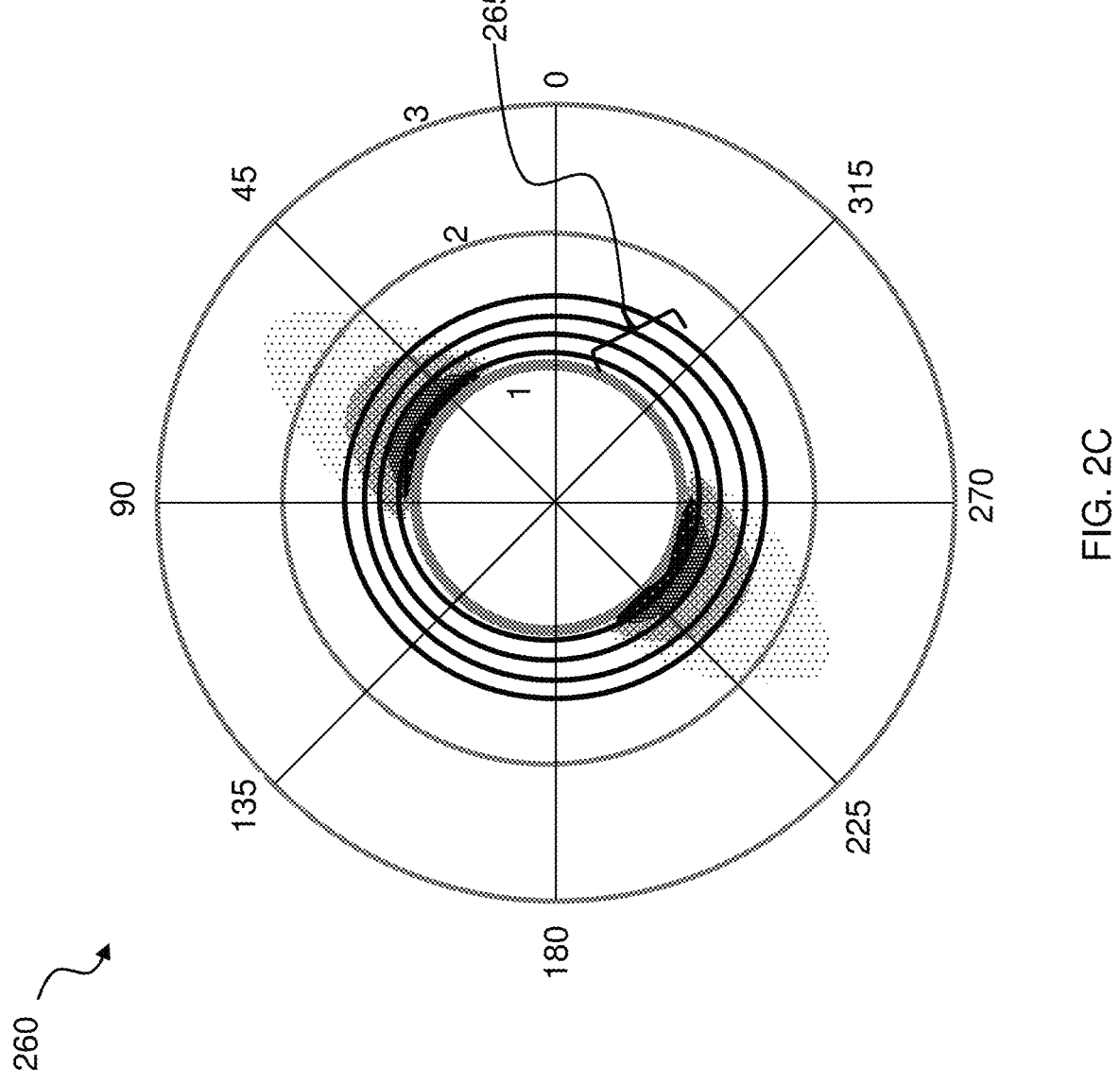
FIG. 2C is an illustration of a diagram of an example top view 260.

FIG. 2C is an illustration of a diagram of an example top view 260. Top view 260 is a top-down view of the distance layers as shown in 3D visualization 230, arrayed on the radial diagram of radial analysis 200. The radial distance layers, such as first distance layer 255 and second distance layer 257 form a group of radial distance layers 265.

Figure 2D:
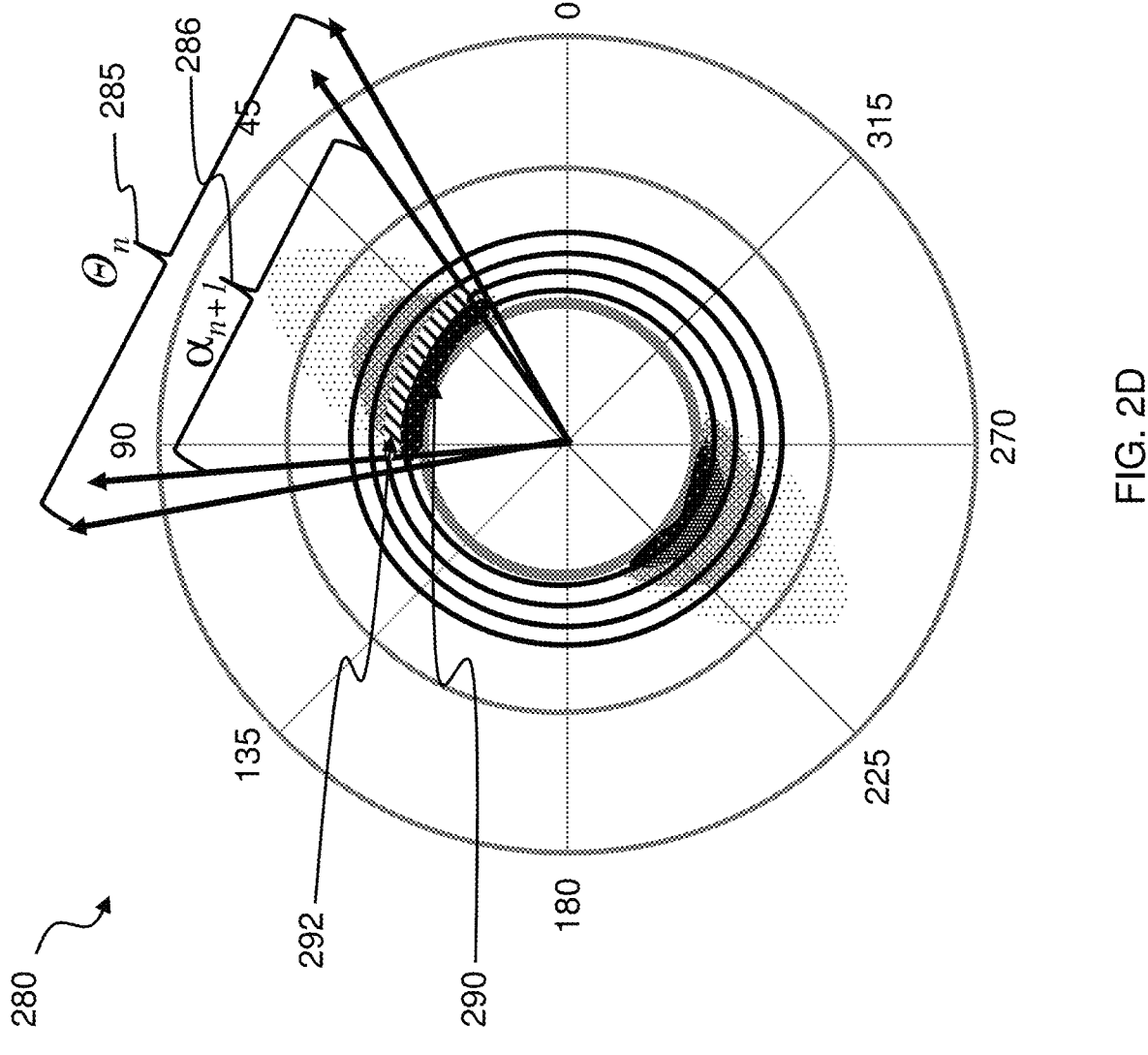
FIG. 2D is an illustration of a diagram of an example analysis 280.

FIG. 2D is an illustration of a diagram of an example analysis 280. Analysis 280 builds on radial analysis 200 and top view 260. Analysis 280 demonstrates a first breakout angle 285 which is an angle θ at the $n^{th}$ radial distance layer. A second breakout angle 286 is shown with an angle α at the $n^{th}+1$ radial distance layer. First breakout angle 285 and second breakout angle 286 can each be a restricted set of angles. The restricted set of angles utilize vectors that originate from the center point of the borehole and are perpendicular to the inner surface of the borehole. A BSI data 290 is shown within the radial distance layer n, and a BSI data 292 is shown within the radial distance layer n+1.

Figure 3:
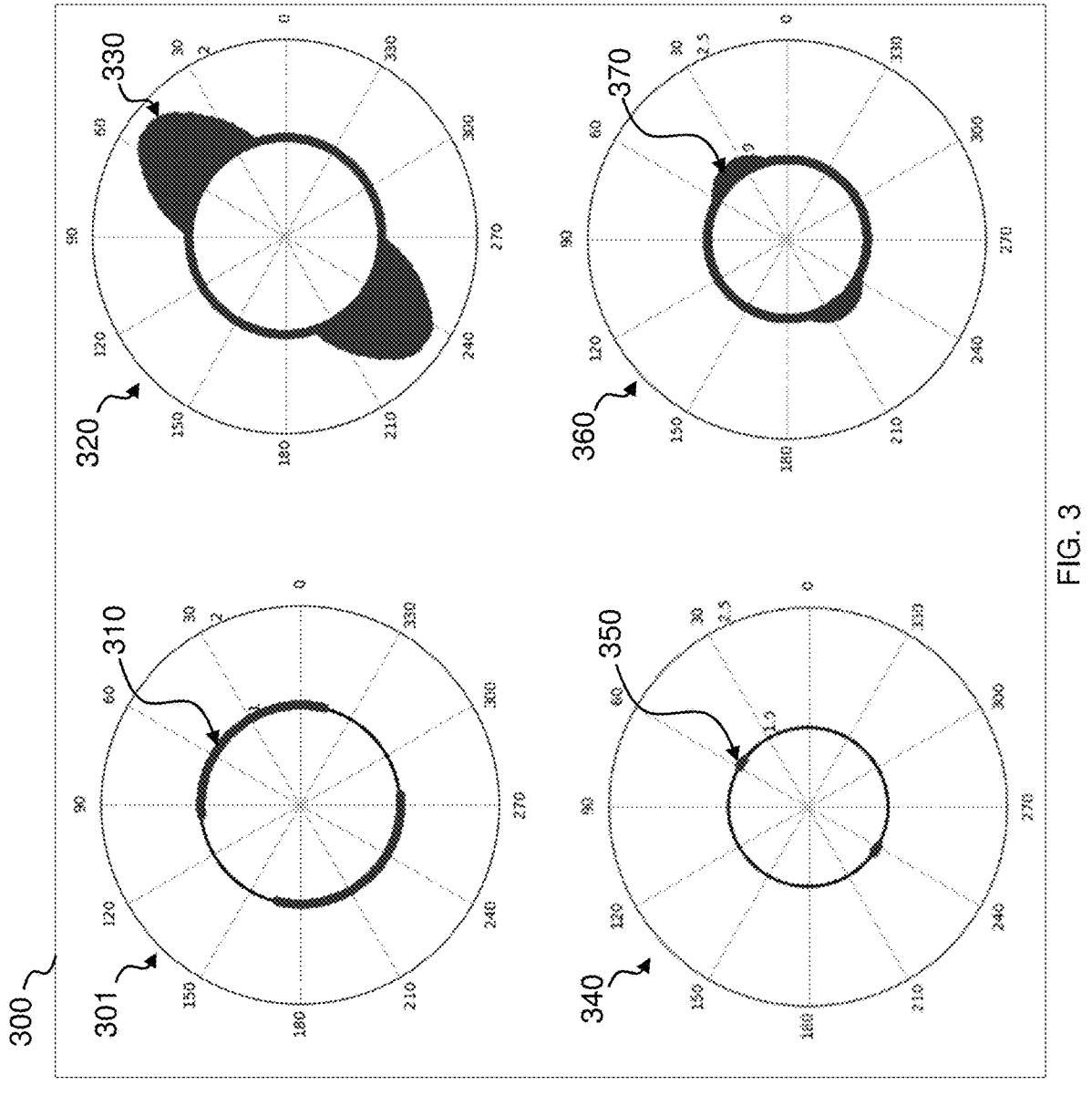
FIG. 3 is an illustration of a comparison diagram of an example borehole stability analysis.

FIG. 3 is an illustration of a comparison diagram of an example borehole stability analysis 300. Borehole stability analysis 300 utilizes a similar polar coordinate system as shown in FIG. 2A. Each coordinate plot represents the same drilling and downhole conditions with the exception that the top two coordinate plots represent shale rock characteristics and the bottom two coordinate plots represent carbonate rock characteristics.

A coordinate plot 301 is an example of a borehole stability index 310 at a measured depth layer of 2,800 feet within the borehole in a shale-type subterranean formation. A coordinate plot 320 is an example of a borehole stability index 330 at a measured depth layer of 5,400 feet within the borehole in a shale-type subterranean formation. The depths analyzed between 2,800 to 5,400 feet form the measured depth interval.

A coordinate plot 340 is an example of a borehole stability index 350 at a measured depth layer of 2,800 feet within the borehole in a carbonate-type subterranean formation. A coordinate plot 360 is an example of a borehole stability index 370 at a measured depth layer of 5,400 feet within the borehole in a carbonate-type subterranean formation. Using the same scale for each coordinate plot, the calculated borehole stability index for the shale analysis can represent a larger potential impact than the borehole stability index for the carbonate analysis. The reflected direct symmetry borehole stability indexes are also represented on each respective coordinate plot.

Figure 4:
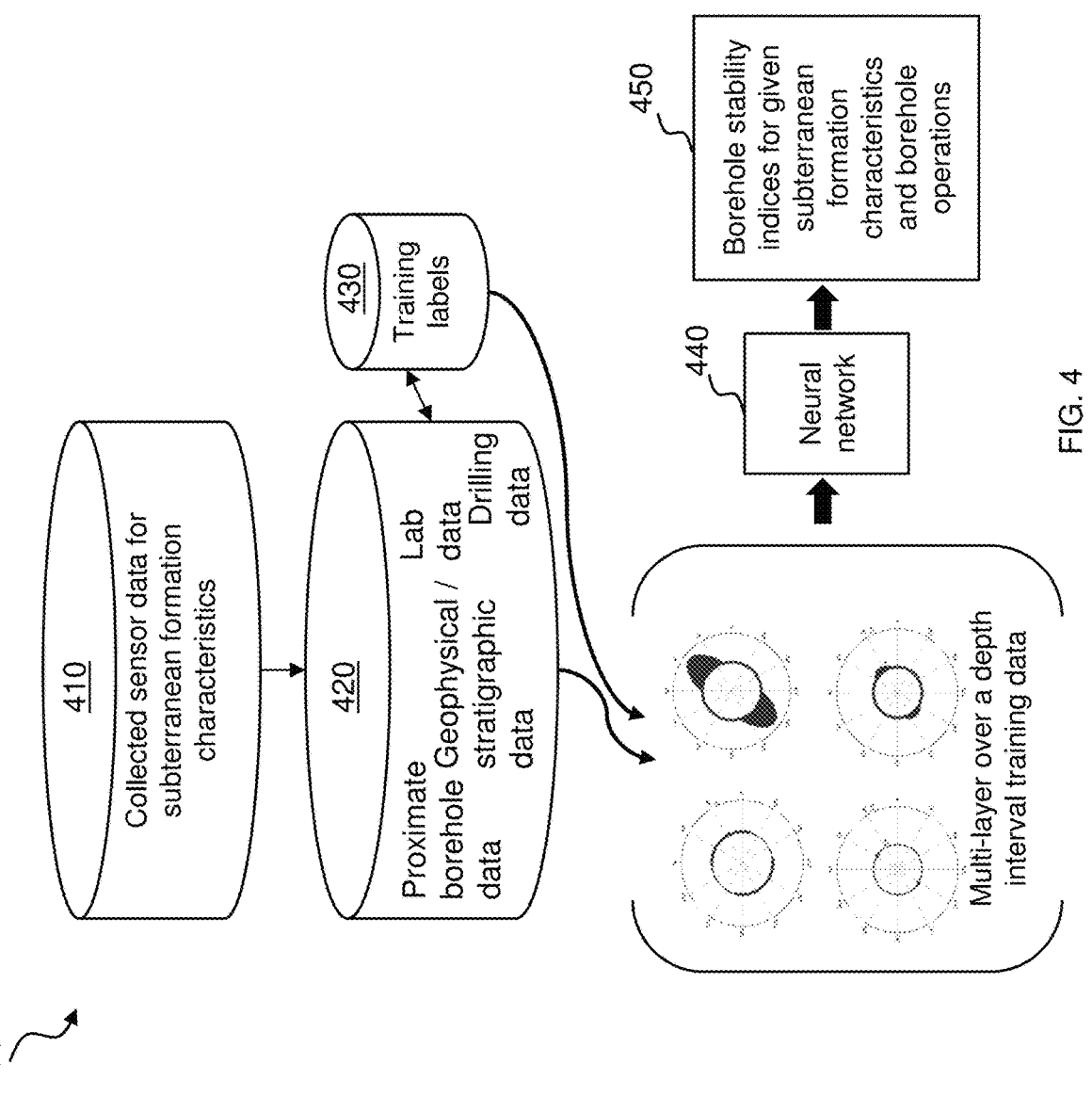
FIG. 4 is an illustration of a diagram of an example borehole stability analysis training flow for training a borehole stability machine learning system.

FIG. 4 is an illustration of a diagram of an example borehole stability analysis training flow 400 for training a borehole stability machine learning system. Borehole stability analysis training flow 400 can be used to train a machine learning system using one or more machine learning models of the borehole stability analysis processes. A data store 410 can receive the sensor data collected from one or more sensors or sensor tools located downhole or a surface location proximate to the borehole. Data store 410 can receive drilling parameters being used for the drilling operation, for example, WOB, RPM, mud composition, mud temperature, mud pressure, drilling angle, or other drilling parameters.

In a process 420, the received sensor data can be transformed to an appropriate coordinate system, such as a cylindric or polar coordinate system. Process 420 can receive data from sources other than the current borehole. For example, data can be received from a proximate borehole, from geophysical data sources, stratigraphic data sources, laboratory data, corporate data, or drilling operation data for the current or other boreholes.

In a process 430, the sensor data can be labeled for training the machine learning models. The training label can be obtained from legacy interpretation, user operation, label fusion, or using a cross-validation workflow. The trained machine learning models can be used to process the sensor data in a process 440 to generate a borehole stability analysis result for each simulation iteration for each radial distance layer, combining the results to generate an estimate of a borehole stability index.

In a process 450, the borehole stability analysis result for the measured depth interval being analyzed can be produced by arithmetically combining (using an arithmetic algorithm) the borehole stability indexes for each radial distance layer (radial distance layers into the subterranean formation) and each measured depth layer of the borehole in a measured depth interval from process 440 using a weighting algorithm. The algorithm used for the combining can be, for example, an average, a mean, a median, a weighted average, or other types of algorithms. The resulting borehole stability learning machine model can be used with other collected sensor data of subterranean formation characteristics and drilling operation parameters to estimate a borehole stability index. This output can then be used as inputs into another process, such as to modify the drilling operation plan, modify a mud pump operation, modify a rig controller parameter, modify a downhole drilling assembly parameter, modify a geo-steering parameter, modify an HF pump operation, or modify other controller or drilling operation parameters.

FIGS. 2-4 demonstrate a partial visual display of the borehole stability analysis. In some aspects, the visual display can be utilized by a user to determine the next steps of the analysis. In some aspects, the visual display does not need to be generated, and a system, such as a machine learning system, can perform the analysis using the received data. In some aspects, a visual display and a machine learning system can be utilized. In some aspects, the analysis of the sensor data can occur by a downhole tool, such as a geo-steering tool or a BHA. In some aspects, the sensor data can be transmitted to one or more surface computing systems, such as a well site controller, a computing system, a cloud environment, a data center, a laboratory, an edge computing system, or other processing system. The surface system or surface systems can perform the analysis, and can communicate the results to one or more other systems, such as a data store, a corporate system, a reservoir controller, a well site controller, a well site operation planner, a geo-steering system, a rig controller, a mud pump, an HF controller, or another borehole system.

Figure 5:
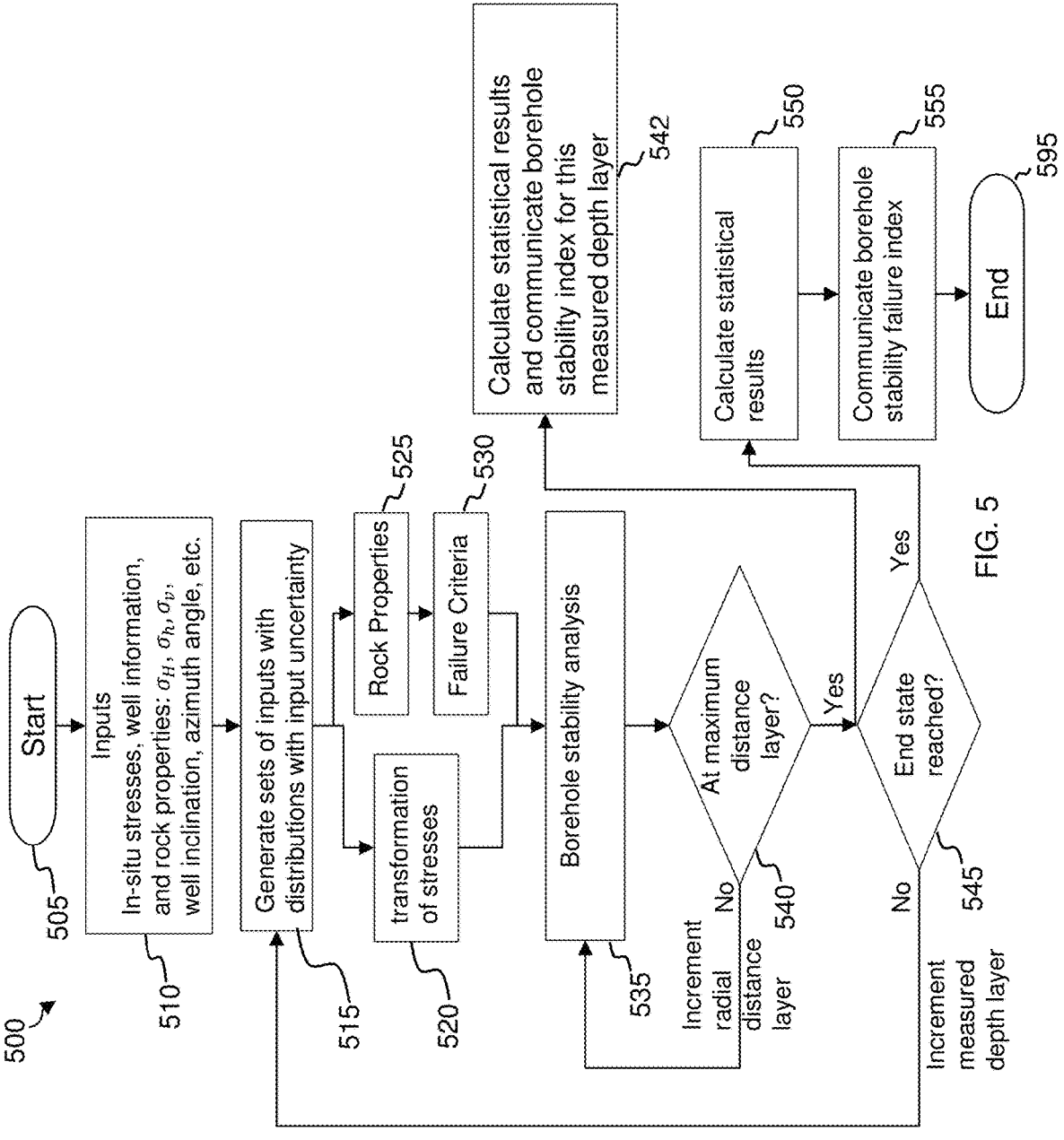
FIG. 5 is an illustration of a flow diagram of an example method to determine a borehole stability index.

FIG. 5 is an illustration of a flow diagram of an example method 500 to determine a borehole stability index. Method 500 can be performed on a computing system, for example, borehole stability analyzer system 800 of FIG. 8 or borehole stability analyzer controller 900 of FIG. 9. The computing system can be a well site controller, a reservoir controller, a geo-steering system, a rig controller system, a drilling controller, an HF controller, a data center, a cloud environment, a server, a laptop, an edge computing system, a mobile device, a smartphone, a PDA, or other computing system capable of receiving the sensor data, input parameters, and capable of communicating with other computing systems. Method 500 can be encapsulated in software code or in hardware, for example, an application, code library, dynamic link library, module, function, RAM, ROM, and other software and hardware implementations. The software can be stored in a file, database, or other computing system storage mechanism. Method 500 can be partially implemented in software and partially in hardware. Method 500 can perform the steps for the described processes, for example, using a machine learning system to determine an estimated borehole stability index given the subterranean formation characteristics and the drilling operation plan.

Method 500 starts at a step 505 and proceeds to a step 510. In step 510, the inputs are received. The inputs can be system or user parameters, for example, a starting measured depth within the borehole, a measured depth interval, a measured depth increment, a radial distance to analyze into the subterranean formation at each measured depth layer (e.g., the R radius), a machine learning model to utilize, a simulation model to utilize, a target number of simulations to perform at each radial distance layer, uncertainty ranges for the data collected by the sensors, a distance increment to use for the radial distance layer by radial distance layer analysis from the inner surface of the borehole to the maximum specified distance into the subterranean formation, or other input parameters.

The inputs can be the sensor data collected from surface sensors or downhole sensors at the borehole. The sensor data represents the subterranean formation characteristics at the location where the sensor collects the data. In some aspects, the sensor data received can be in real-time or near real-time so that the borehole stability analysis can be performed while borehole operations are ongoing. In some aspects, the inputs can be a machine learning model, training model, or other data model to be used with the borehole stability analysis or to receive the results of the borehole stability analysis. In some aspects, the inputs can be other data sources, such as geophysical data, stratigraphic data, sensor data previously collected at the current borehole (e.g., previous sensor collection), sensor data collected at proximate boreholes, laboratory data, or other data sources.

The uncertainty ranges can be specified by a user, a system, defaulted to a parameter, or calculated by the system using the type of sensor and downhole environment parameters. For example, for a sensor of a certain type, the uncertainty can be ±5% at a specified temperature range downhole, and ±15% when the temperate downhole exceeds the specified temperature range. Each measurement type or sensor type can have varying uncertainty range parameters.

In a step 515, the borehole stability analysis process begins at the designated starting measured depth of the borehole. The sensor data correlating to the starting measured depth is analyzed. Method 500 proceeds to a step 520 and a step 525. In step 520, the portion of the sensor data that represents the rock stresses of the subterranean formation characteristics can be transformed to one or more coordinate systems, such as a Cartesian coordinate system, a polar coordinate system, or a cylindric coordinate system (e.g., generating transformed subterranean formation characteristics by transforming the received subterranean formation characteristics). This transformation allows for the subsequent analysis to be performed using the coordinate system. Method 500 proceeds to a step 535.

In step 525, rock properties are extracted from the subterranean formation characteristics. For example, an identification can be made between shale or sandstone type of rock, carbonate type of rock, or other category of rock. In a step 530, the failure criterion can be determined from the rock type, such as using the Mohr-Coulomb or Mogi-Coulomb failure criterion. Method 500 proceeds to a step 535.

Once step 520 and step 530 have been completed, method 500 proceeds to step 535 where, starting at the inner surface of the borehole at a measured depth layer (starting at the starting measured depth), a radial distance layer analysis is conducted of the borehole stability and a borehole stability index for that radial distance layer can be determined. The borehole stability index is calculated using a determined number of simulation iterations across the uncertainty range of values for the measurement being analyzed. In some aspects, the borehole stability index can be represented by a decimal number in an exclusive range of 0.0 to 100.0. In some aspects, zero can mean there is a very low chance of an adverse issue occurring and 100 can mean that a critical issue is likely to occur.

The radial distance layer analysis can be conducted by a machine learning system, such as applying a learned model to the sensor data and the drilling parameters to determine the results. In a decision step 540, a determination is made whether the current radial distance layer being analyzed is at the maximum radial distance layer into the subterranean formation. If the resultant is "No", then the layer radial distance is incremented by the radial distance increment (for example, 0.2R) and the next radial distance layer into the subterranean formation is analyzed in step 535. If the resultant is "Yes", then method 500 proceeds to a decision step 545 and a step 542.

In step 542, the calculated results can be calculated using a simulation model, and the borehole stability index (e.g., statistical results) for this measured depth layer can be communicated to another process or system. The BSI at this measured depth layer can be communicated, such as in real-time, near real-time, batch, or other type of reporting time frame. The BSI results can be used for adjustment of drilling parameters, borehole operation parameters, or other borehole-related operations.

In a decision step 545, a determination is made whether an end state has been reached. For example, an end state can be that the total measured depth interval has been analyzed, the borehole stability index has reached a zero value, or the drilling operation specifies an end to the borehole stability analysis. If the resultant is "No", then the measured depth layer is incremented to the next measured depth layer using the measured depth increment. Method 500 proceeds to step 515 to perform the borehole stability analysis radial distance layer by radial distance layer into the subterranean formation at the new measured depth layer. If the resultant is "Yes", then method 500 proceeds to a step 550.

In step 550, the borehole stability results are calculated. The combined borehole stability index can utilize various types of algorithms to combine the data across the simulation iterations at each radial distance layer for each measured depth layer. The combination can be an algorithmic combination, such as an average, a mean, a median, a weighted combination, or other mathematical algorithms. In some aspects, the borehole stability analysis can be conducted for more than one type of borehole operation factor. The borehole stability analysis for different borehole factors can be conducted serially, in parallel, overlapping, or a combination thereof. In aspects where more than one borehole operation factor is being analyzed, step 550 can arithmetically combine the combined borehole stability index for each borehole operation factor to generate a composite borehole stability index.

In a step 555, the results, e.g., the combined or composite borehole stability index (e.g., the results), can be communicated to one or more users, user systems, drilling controllers, borehole controllers, or other computing systems. The borehole stability index can represent a portion of the borehole or the whole borehole. The results can be used as inputs into other processes, such as to modify drilling operations in a drilling controller. The results can be represented in several different ways. For example, the results can be on a scale of 0.0 to 100.0. A critical stability value can be specified, for example, 80.0 to 100.0, and a warning value can start at 50.0 to 80.0. Other values can be specified for these stability indexes. In some aspects, the results can be classified as 'critical', 'warning', or 'normal'. The words used can vary, the intent is to create a three or more-step criticality scale that can be used by users or other systems to estimate the borehole stability if the current borehole operation is to continue.

The results can be used, for example, by a geo-steering system to update a planned borehole path to be drilled by a drilling system, by a reservoir controller or well site controller to modify a planned borehole path, by a drilling controller to modify drilling parameters (e.g., WOB, RPM, mud composition, mud temperature, mud pressure, drill bit parameters, drilling angle, drilling direction, or other drilling parameters), by an HF controller to modify the fracturing mud parameters, or by other systems, such as corporate systems, edge computing systems, data centers, cloud environments, or other computing systems to update borehole operation plans or to update machine learning models.

In some aspects, the results can be used as a standalone estimator or tied with other calculations to monitor potential issues within the borehole in real-time or near real-time. In some aspects, after the results of the borehole stability analysis have been tied to other calculations within the system, the combined results can be used to infer a root cause of the issues occurring in the borehole. In some aspects, once the inference has been determined, remediation directions can be generated, e.g., modifications to the current borehole operation parameters. In some aspects, the projected root cause can be communicated to other systems to generate remediation actions. The remediation actions can then occur before the critical event occurs. These aspects can be used to provide an automated system to remediate potential issues downhole the borehole before those issues occur. For example, the borehole stability index can be used with other data, such as current drilling operation parameters, to infer a root cause of the potential issues indicated by the borehole stability index. This inference can be used to modify the drilling parameters to then reduce the borehole instability. In some aspects, the inferencing can be part of a machine learning system where the output is a projected root cause. Method 500 ends at a step 595.

FIG. 6 is an illustration of a chart of example uncertainty values 600. Uncertainty values 600 shows a sample for demonstration purposes of borehole operation factors 610 that can be analyzed through data collected by sensors. Corresponding uncertainty parameters 620 are shown for each borehole operation factor in borehole operation factors 610. For example, mud weight can be measured with a relatively higher degree of certainty at a surface location, so the uncertainty is specified as ±5%. Borehole formation characteristics, such as the uniaxial compressive strength or pore pressure, are measured downhole the borehole, therefore the uncertainty of the collected data is less certain and uses a larger range of ±40%. The uncertainty range can be reduced to improve the possibility estimation when more downhole data is obtained while the drilling operation progresses.

Figure 7:
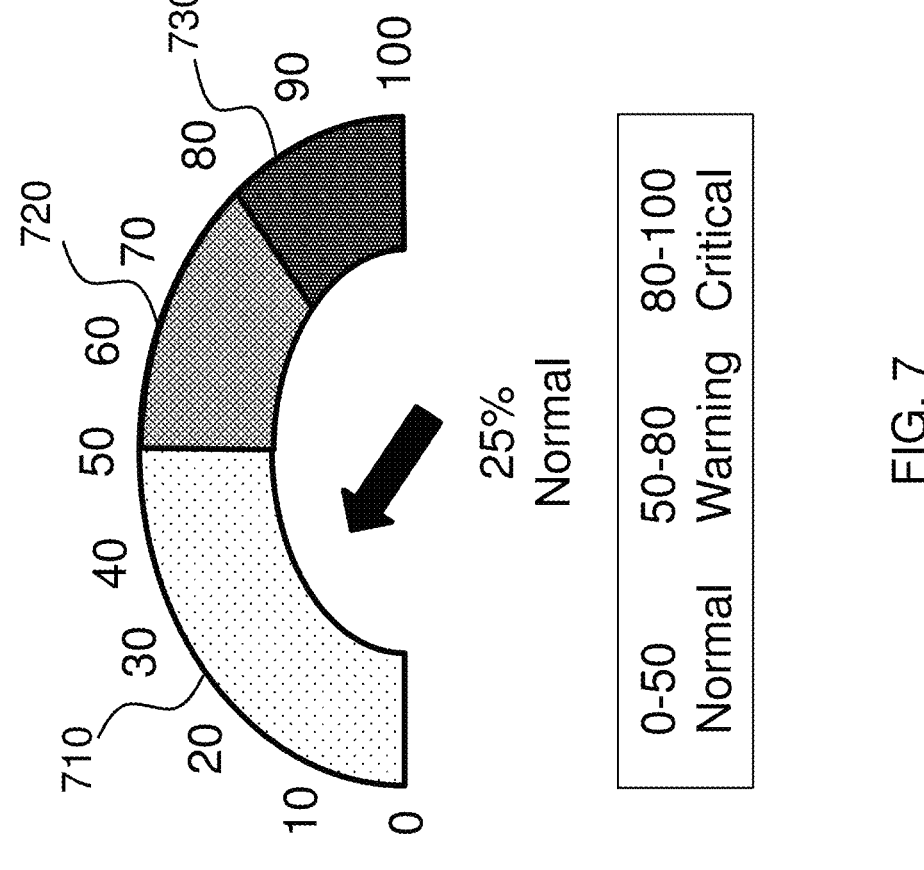
FIG. 7 is an illustration of a diagram of an example visual gauge showing a borehole stability result.

FIG. 7 is an illustration of a diagram of an example visual gauge 700 showing a borehole stability result. Visual gauge 700 is one type of result that can be generated and is shown for demonstration purposes. Other result types can be generated such as an indicator of the criticality, a parameter that can be communicated to other systems, or other types of computer-readable or visual results. Visual gauge 700 demonstrates a user visual that can be used to show the combined borehole stability index or the composite borehole stability index on a gauge. A portion 710 indicates the normal range of borehole operations. A portion 720 indicates the warning range of borehole operations. A portion 730 indicates the critical range of borehole operations. Visual gauge 700 is shown in black and white, and in other aspects, color, shapes, patterns, or other visual indicators can be used.

Figure 8:
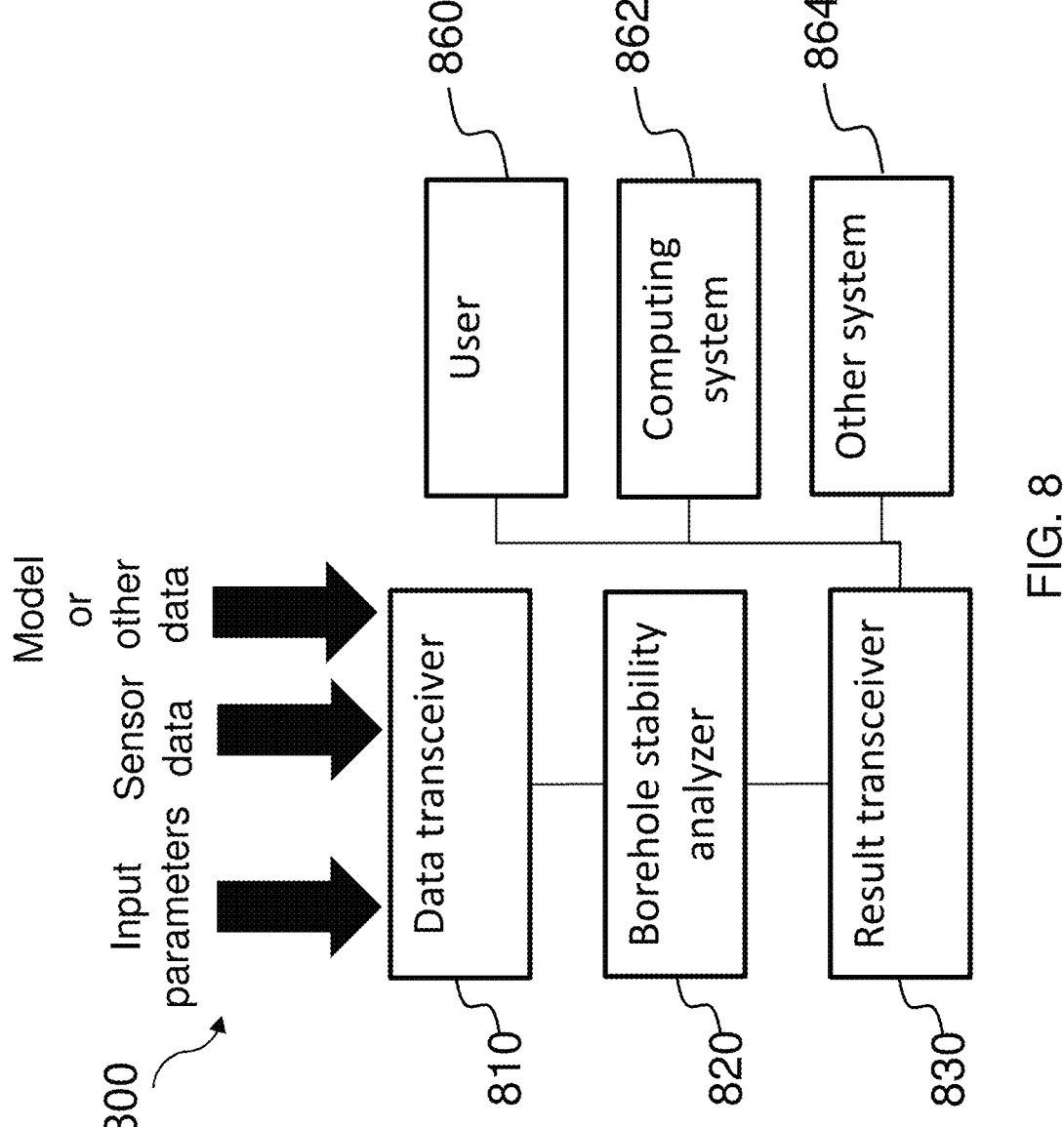
FIG. 8 is an illustration of a block diagram of an example borehole stability analyzer system.

FIG. 8 is an illustration of a block diagram of an example borehole stability analyzer system 800. Borehole stability analyzer system 800 can be implemented in one or more computing systems, for example, a data center, a cloud environment, a server, a laptop, a smartphone, a tablet, an edge computing system, a laboratory system, or other computing systems. In some aspects, borehole stability analyzer system 800 can be implemented using a borehole stability analyzer controller such as borehole stability analyzer controller 900 of FIG. 9. Borehole stability analyzer system 800 can implement one or more methods of this disclosure, such as method 500 of FIG. 5.

Borehole stability analyzer system 800, or a portion thereof, can be implemented as an application, a code library, a dynamic link library, a function, a module, other software implementation, or combinations thereof. In some aspects, borehole stability analyzer system 800 can be implemented in hardware, such as a ROM, a graphics processing unit, or other hardware implementation. In some aspects, borehole stability analyzer system 800 can be implemented partially as a software application and partially as a hardware implementation. Borehole stability analyzer system 800 is a functional view of the disclosed processes and an implementation can combine or separate the described functions in one or more software or hardware systems.

Borehole stability analyzer system 800 includes a data transceiver 810, a borehole stability analyzer 820, and a result transceiver 830. The borehole stability results, e.g., the borehole stability index, and interim outputs from borehole stability analyzer 820 can be communicated to a data receiver, such as one or more of a user or user system 860, a computing system 862, or other processing or storage systems 864. The borehole stability results can be used to determine modifications to the borehole operations to reduce the risk of borehole instability or to improve the efficiency of the borehole operations. The borehole stability results can be communicated to one or more borehole controllers, such as a rig controller to adjust WOB, a mud pump to adjust the composition, temperature, or pressure of drilling fluid, a drilling controller or a drilling assembly to adjust an angle of drilling or an RPM, a geo-steering system to adjust the operation of a drilling assembly or drill bit, or other borehole controllers. The borehole controller can be a well site controller, a reservoir controller, a drilling controller, a BHA, a drilling assembly, or other controllers.

Data transceiver 810 can receive input parameters, such as parameters to direct the operation of the analysis implemented by borehole stability analyzer 820, such as algorithms to utilize in determining how to determine the borehole stability index, a distance increment to utilize, a distance to use into the subterranean formation (e.g., the R radii value), a measured depth interval, a measured depth increment, a starting depth, a machine learning model to use in the analysis, a simulation model to utilize, a target number of simulation iterations to perform, or other input parameters, such as zero or more other data sources to use (e.g., geophysical, stratigraphic, proximate boreholes, laboratory, or other data sources). Data transceiver 810 can receive sensor data collected with surface or downhole sensors where the sensor data represents subterranean formation characteristics within the previously specified R distance of the center of the borehole. In some aspects, data transceiver 810 can be part of borehole stability analyzer 820.

Result transceiver 830 can communicate one or more results, analysis, or interim outputs, to one or more data receivers, such as user or user system 860, computing system 862, storage system 864, e.g., a data store or database, or other related systems, whether located proximate result transceiver 830 or distant from result transceiver 830. Computing system 862 can be one or more drilling operation controllers. Storage system 864 can be a machine learning training system or a machine learning model system.

Data transceiver 810, borehole stability analyzer 820, and result transceiver 830 can be or can include conventional interfaces configured for transmitting and receiving data. In some aspects, borehole stability analyzer 820 can be a machine learning system, such as providing a process to analyze sensor data and drilling operation plans by using computational methods to estimate a borehole stability index over a measured depth interval.

Borehole stability analyzer 820 can implement the analysis and algorithms as described herein utilizing the sensor data, the input parameters, and optionally the machine learning model data or other data sources. For example, borehole stability analyzer 820 can perform the analysis of the sensor data to compute a borehole stability index.

A memory or data storage of borehole stability analyzer 820 can be configured to store the processes and algorithms for directing the operation of borehole stability analyzer 820. Borehole stability analyzer 820 can include a processor that is configured to operate according to the analysis operations and algorithms disclosed herein, and an interface to communicate (transmit and receive) data.

Figure 9:
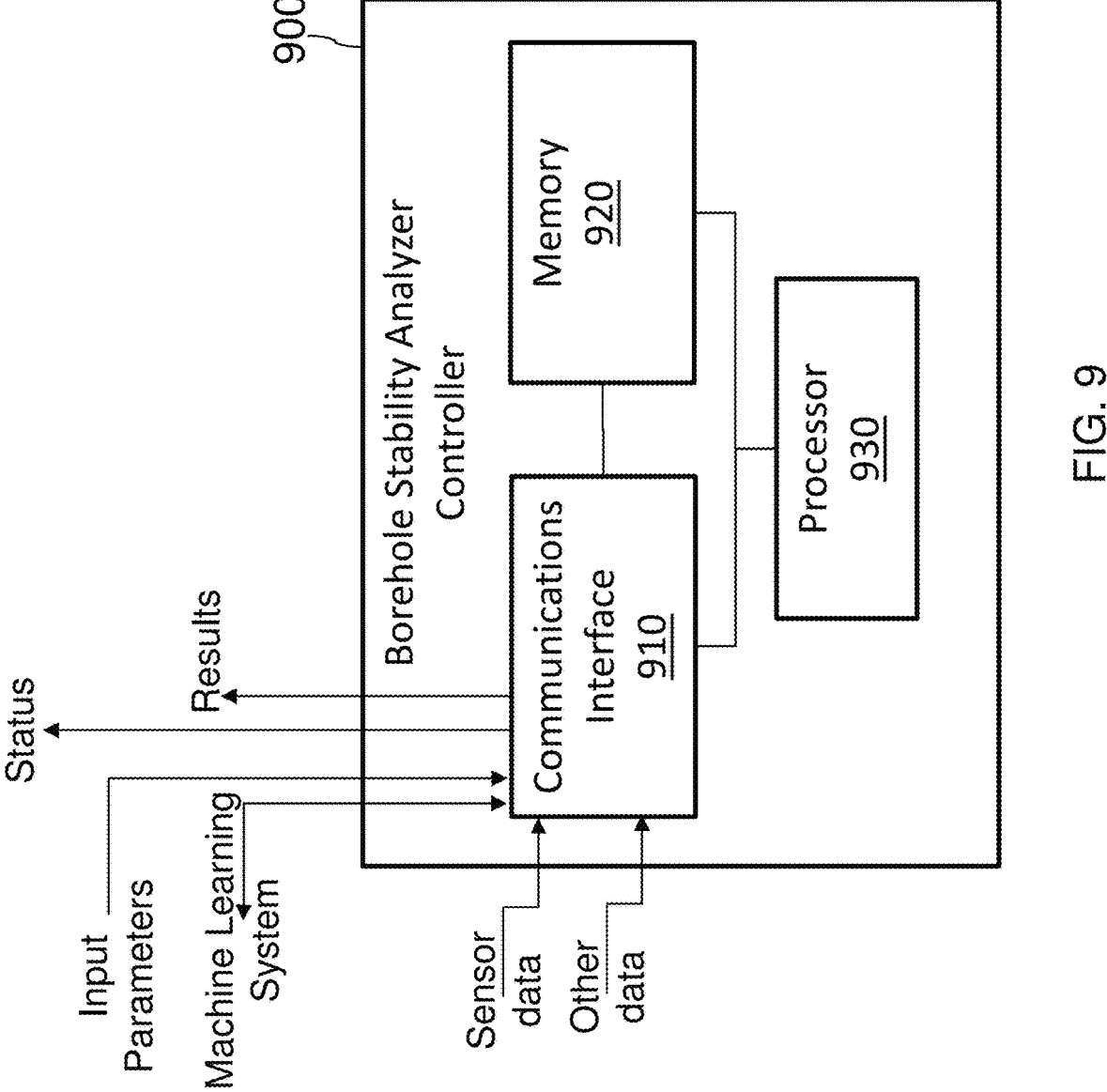
FIG. 9 is an illustration of a block diagram of an example borehole stability analyzer controller according to the principles of the disclosure.

FIG. 9 is an illustration of a block diagram of an example borehole stability analyzer controller 900 according to the principles of the disclosure. Borehole stability analyzer controller 900 can be stored on a single computer or multiple computers. The various components of borehole stability analyzer controller 900 can communicate via wireless or wired conventional connections. A portion or a whole of borehole stability analyzer controller 900 can be located at one or more locations and other portions of borehole stability analyzer controller 900 can be located on a computing device or devices located at a surface location. In some aspects, borehole stability analyzer controller 900 can be wholly located at a surface or distant location. In some aspects, borehole stability analyzer controller 900 can be part of another system, or can be integrated into a single device, such as a part of a borehole operation planning system, a drilling controller, a reservoir controller, a corporate system, a data center, a cloud environment, an edge computing system, a well site controller, a geo-steering system, or other borehole systems or controllers.

Borehole stability analyzer controller 900 can be configured to perform the various functions disclosed herein including receiving input parameters, sensor data machine learning models, or other data, and generating results from an execution of the methods and processes described herein, such as estimating a borehole stability index, and other results and analysis. Borehole stability analyzer controller 900 includes a communications interface 910, a memory 920, and a processor 930.

Communications interface 910 is configured to transmit and receive data. For example, communications interface 910 can receive the input parameters, sensor data, other data, or machine learning models. Communications interface 910 can transmit the generated borehole stability results or interim outputs. In some aspects, communications interface 910 can transmit a status, such as a success or failure indicator of borehole stability analyzer controller 900 regarding receiving the various inputs, transmitting the generated feature results, or producing the generated borehole stability results.

In some aspects, communications interface 910 can receive input parameters from a machine learning system, for example, where the sensor data is processed against learned models to improve the borehole stability index estimation.

In some aspects, the machine learning system can be implemented by processor 930 and perform the operations as described by borehole stability analyzer 820. Communications interface 910 can communicate via communication systems used in the industry. For example, wireless or wired protocols can be used. Communication interface 910 is capable of performing the operations as described for data transceiver 810 and result transceiver 830 of FIG. 8.

Memory 920 can be configured to store a series of operating instructions that direct the operation of processor 930 when initiated, including the code representing the algorithms for determining processing the collected data. Memory 920 is a non-transitory computer-readable medium. Multiple types of memory can be used for data storage and memory 920 can be distributed.

Processor 930 can be configured to produce the generated borehole stability results (e.g., estimated borehole stability index, and other results), one or more interim outputs, and statuses utilizing the received inputs. For example, processor 930 can analyze sensor data at more than one measured depth layer to estimate a borehole stability index over a measured depth interval. Processor 930 can be configured to direct the operation of borehole stability analyzer controller 900. Processor 930 includes the logic to communicate with communications interface 910 and memory 920, and perform the functions described herein. Processor 930 is capable of performing or directing the operations as described by borehole stability analyzer 820 of FIG. 8.

A portion of the above-described apparatus, systems, or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate array (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that has program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher-level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is to describe particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Aspects disclosed herein include:

A. A method, including (1) receiving input parameters for a subterranean formation proximate a borehole undergoing a borehole operation, wherein the input parameters include user parameters and received subterranean formation characteristics received from one or more sensors, (2) generating transformed subterranean formation characteristics by transforming the received subterranean formation characteristics representing rock stress to a coordinate system, (3) calculating subterranean formation parameters using the transformed subterranean formation characteristics and the received subterranean formation characteristics, (4) applying a lithology-specific algorithm to the subterranean formation parameters to generate a failure criterion, (5) performing a borehole stability analysis using a simulation model, the failure criterion, and the received subterranean formation characteristics to determine the borehole stability index, further including (5A) determining an uncertainty range for the subterranean formation characteristics, (5B) iterating through the uncertainty range using a specified number of iteration steps, wherein the borehole stability analysis is performed at each iteration step, and (5C) combining the borehole stability analysis from each iteration step using an arithmetic algorithm to determine the borehole stability index, and (6) communicating the borehole stability index to a borehole controller of the borehole.

B. A system, including (1) a data transceiver, capable of receiving input parameters for a borehole undergoing a drilling operation, wherein the input parameters include user parameters and subterranean formation characteristics received from one or more sensors located downhole the borehole or located at surface locations proximate the borehole, and (2) a borehole stability analyzer, capable of communicating with the data transceiver, generating transformed subterranean formation characteristics by transforming a portion of the subterranean formation characteristics that relate to rock stress to a coordinate system, calculating subterranean formation parameters using the transformed subterranean formation characteristics, applying a lithology-specific algorithm to the subterranean formation parameters to generate a failure criterion, performing a borehole stability analysis using the failure criterion on the subterranean formation characteristics to determine a borehole stability index, and communicate the borehole stability index to a borehole controller, wherein the performing the borehole stability analysis determines an uncertainty range for the subterranean formation characteristics, iterates through the uncertainty range using a specified number of iteration steps where the borehole stability analysis is performed at each iteration step, and combining the borehole stability analysis for each of the iteration steps using an arithmetic algorithm to determine the borehole stability index.

C. A computer program product having a series of operating instructions stored on a non-transitory computer-readable medium that directs a data processing apparatus when executed thereby to perform operations to determine a borehole stability index, the operations including (1) receiving input parameters for a subterranean formation proximate a borehole undergoing a borehole operation, wherein the input parameters include user parameters and received subterranean formation characteristics received from one or more sensors, (2) generating transformed subterranean formation characteristics by transforming the received subterranean formation characteristics representing rock stress to a coordinate system, (3) calculating subterranean formation parameters using the transformed subterranean formation characteristics and the received subterranean formation characteristics, (4) applying a lithology-specific algorithm to the subterranean formation parameters to generate a failure criterion, (5) performing a borehole stability analysis using a simulation model, the failure criterion, and the received subterranean formation characteristics to determine the borehole stability index, further including (5A) determining an uncertainty range for the subterranean formation characteristics, (5B) iterating through the uncertainty range using a specified number of iteration steps, wherein the borehole stability analysis is performed at each iteration step, and (5C) combining the borehole stability analysis from each iteration step using an arithmetic algorithm to determine the borehole stability index, and (6) communicating the borehole stability index to a borehole controller of the borehole.

Each of the disclosed aspects in A, B, and C can have one or more of the following additional elements in combination. Element 1: wherein the uncertainty range specifies a plus or minus range using a measurement, a calculated value, or a modeled value for the subterranean formation characteristic as a center value. Element 2: wherein the uncertainty range is modified using a downhole environment parameter. Element 3: wherein the specified number of iteration steps is 2 or more. Element 4: wherein the simulation model is a Monte Carlo simulation. Element 5: wherein the arithmetic algorithm is one of an average, a mean, a median, or a weighted average. Element 6: wherein the borehole stability index is a value in a first range of 0.0 to 100.0, or a second range of 0.0 to 1.0. Element 7: wherein the borehole stability index is a parameter representing one of a critical state, a warning state, or a normal state. Element 8: wherein a portion of the received subterranean formation characteristics representing a radial distance layer is utilized. Element 9: wherein the calculating, applying, and performing are repeated for each successive radial distance layer from an inner surface of the borehole to a maximum specified distance. Element 10: wherein a portion of the received subterranean formation characteristics representing a radial distance layer is utilized and the calculating, applying, and performing are executed at an inner surface of the borehole. Element 11: wherein the lithology-specified algorithm is a Mogi-Coulomb failure criterion when the received subterranean formation characteristics indicate a carbonate rock, or the lithology-specific algorithm is a Mohr-Coulomb failure criterion when the received subterranean formation characteristics indicate a sandstone or a shale rock. Element 12: wherein the generating calculates a principal stress by subtracting from the rock stress a result of a Biot's coefficient multiplied by a pore pressure derived from the received subterranean formation characteristics. Element 13: wherein the rock stress is one or more of a vertical stress parameter, a minimum horizontal stress parameter, a maximum horizontal stress parameter, an inclination parameter, an azimuth parameter, or an orientation of the maximum horizontal stress parameter. Element 14: wherein the received subterranean formation characteristics are determined from real-time or near real-time data collected by downhole sensors or at a surface location proximate the borehole. Element 15: wherein the received subterranean formation characteristics are received and correlated from data received from one or more of a previous sensor collection in the borehole, a proximate borehole, a laboratory, a data store, a cloud environment, or a computing system. Element 16: wherein the generating, calculating, applying, and performing are repeated at more than one measured depth layer of a measured depth interval, where the measured depth layer is incremented by a measured depth increment until an end state is satisfied. Element 17: wherein the borehole stability index is determined at each performing is arithmetically combined to obtain a combined borehole stability index for the measured depth interval. Element 18: wherein the performing is executed for more than one borehole operation factor, and the borehole stability index for each borehole operation factor is arithmetically combined to a composite borehole stability index. Element 19: wherein the determining utilizes a different uncertainty range for each of the more than one borehole operation factor. Element 20: further including inferring a root cause of a borehole instability by using the borehole stability index with parameters of the borehole operation. Element 21: further including communicating remediation directions generated using the root cause. Element 22: further including a borehole stability machine learning system, capable of communicating with the borehole stability analyzer and to perform the calculating, applying, and performing steps of the borehole stability analyzer. Element 23: further including a result transceiver, capable of communicating the borehole stability index and interim outputs to a user system, a data store, a computing system, or a borehole controller. Element 24: wherein the borehole controller is one of a geo-steering system, a mud pump, a rig controller, a drilling controller, a drilling assembly, a well site controller, the computing system, or a drilling operation system.

What is claimed is:

1. A method, comprising:

receiving input parameters for a subterranean formation proximate a borehole undergoing a borehole operation, wherein the input parameters include user parameters and received subterranean formation characteristics received from one or more sensors;

generating transformed subterranean formation characteristics by transforming the received subterranean formation characteristics representing rock stress to a coordinate system;

calculating subterranean formation parameters using the transformed subterranean formation characteristics and the received subterranean formation characteristics;

applying a lithology-specific algorithm to the subterranean formation parameters to generate a failure criterion;

performing a borehole stability analysis using a simulation model, the failure criterion, and the received subterranean formation characteristics to determine a borehole stability index, further comprising:

determining an uncertainty range for the subterranean formation characteristics;

iterating through the uncertainty range of each subterranean formation characteristic of the subterranean formation characteristics using a specified number of iteration steps and borehole operation factors, wherein the borehole stability analysis is performed at each iteration step; and combining the borehole stability analysis from each iteration step using an arithmetic algorithm to determine the borehole stability index and an uncertainty range of the borehole stability index using the uncertainty range of each subterranean formation characteristic and the borehole operation factors; and modifying a rig controller using the borehole stability index and the uncertainty range of the borehole stability index to adjust operations of the rig controller.

2. The method as recited in claim 1, wherein the uncertainty range specifies a plus or minus range using a measurement, a calculated value, or a modeled value for the subterranean formation characteristic as a center value.

3. The method as recited in claim 2, wherein the uncertainty range is modified using a downhole environment parameter.

4. The method as recited in claim 1, wherein the specified number of iteration steps is 2 or more.

5. The method as recited in claim 1, wherein the simulation model is a Monte Carlo simulation.

6. The method as recited in claim 1, wherein the arithmetic algorithm is one of an average, a mean, a median, or a weighted average.

7. The method as recited in claim 1, wherein the borehole stability index is a value in a first range of 0.0 to 100.0, or a second range of 0.0 to 1.0.

8. The method as recited in claim 1, wherein the borehole stability index is a parameter representing one of a critical state, a warning state, or a normal state.

9. The method as recited in claim 1, wherein a portion of the received subterranean formation characteristics representing a radial distance layer is utilized and the calculating, applying, and performing are repeated for each successive radial distance layer from an inner surface of the borehole to a maximum specified distance.

10. The method as recited in claim 1, wherein a portion of the received subterranean formation characteristics representing a radial distance layer is utilized and the calculating, applying, and performing are executed at an inner surface of the borehole.

11. The method as recited in claim 1, wherein the lithology-specified algorithm is a Mogi-Coulomb failure criterion when the received subterranean formation characteristics indicate a carbonate rock, or the lithology-specific algorithm is a Mohr-Coulomb failure criterion when the received subterranean formation characteristics indicate a sandstone or a shale rock.

12. The method as recited in claim 1, wherein the generating calculates a principal stress by subtracting from the rock stress a result of a Biot's coefficient multiplied by a pore pressure derived from the received subterranean formation characteristics.

13. The method as recited in claim 1, wherein the rock stress is one or more of a vertical stress parameter, a minimum horizontal stress parameter, a maximum horizontal stress parameter, an inclination parameter, an azimuth parameter, or an orientation of the maximum horizontal stress parameter.

14. The method as recited in claim 1, wherein the received subterranean formation characteristics are determined from real-time or near real-time data collected by downhole sensors or at a surface location proximate the borehole.

15. The method as recited in claim 1, wherein the received subterranean formation characteristics are received and correlated from data received from one or more of a previous sensor collection in the borehole, a proximate borehole, a laboratory, a data store, a cloud environment, or a computing system.

16. The method as recited in claim 1, wherein the generating, calculating, applying, and performing are repeated at more than one measured depth layer of a measured depth interval, where the measured depth layer is incremented by a measured depth increment until an end state is satisfied.

17. The method as recited in claim 16, wherein the borehole stability index is determined at each performing is arithmetically combined to obtain a combined borehole stability index for the measured depth interval.

18. The method as recited in claim 1, wherein the performing is executed for more than one borehole operation factor, and the borehole stability index for each borehole operation factor is arithmetically combined to a composite borehole stability index.

19. The method as recited in claim 18, wherein the determining utilizes a different uncertainty range for each of the more than one borehole operation factor.

20. The method as recited in claim 1, further comprising:

inferring a root cause of a borehole instability by using the borehole stability index with parameters of the borehole operation; and communicating remediation directions generated using the root cause.

21. A system, comprising:

a data transceiver, capable of receiving input parameters for a borehole undergoing a drilling operation, wherein the input parameters include user parameters and subterranean formation characteristics received from one or more sensors located downhole the borehole or located at surface locations proximate the borehole; and a borehole stability analyzer, capable of communicating with the data transceiver, generating transformed subterranean formation characteristics by transforming a portion of the subterranean formation characteristics that relate to rock stress to a coordinate system, calculating subterranean formation parameters using the transformed subterranean formation characteristics, applying a lithology-specific algorithm to the subterranean formation parameters to generate a failure criterion, performing a borehole stability analysis using the failure criterion on the subterranean formation characteristics to determine a borehole stability index, and modifying a geo-steering system using the borehole stability index and an uncertainty range of the borehole stability index to adjust operations of the geo-steering system, wherein the performing the borehole stability analysis determines an uncertainty range for the subterranean formation characteristics, iterates through the uncertainty range of each subterranean formation characteristic of the subterranean formation characteristics using a specified number of iteration steps and borehole operation factors where the borehole stability analysis is performed at each iteration step, and combining the borehole stability analysis for each of the iteration steps using an arithmetic algorithm to determine the borehole stability index and the uncertainty range of the borehole stability index using the uncertainty range of each subterranean formation characteristic and the borehole operation factors.

22. The system as recited in claim 21, further comprising: a borehole stability machine learning system, capable of communicating with the borehole stability analyzer and to perform the calculating, applying, and performing steps of the borehole stability analyzer.

23. The system as recited in claim 21, further comprising: a result transceiver, capable of communicating the borehole stability index and interim outputs to a user system, a data store, a computing system, or a borehole controller.

24. The system as recited in claim 23, wherein the borehole controller is one of a drilling controller, a drilling assembly, a well site controller, the computing system, or a drilling operation system.

25. A computer program product having a series of operating instructions stored on a non-transitory computer-readable medium that directs a data processing apparatus when executed thereby to perform operations to determine a borehole stability index, the operations comprising:

receiving input parameters for a subterranean formation proximate a borehole undergoing a borehole operation, wherein the input parameters include user parameters and received subterranean formation characteristics received from one or more sensors;

generating transformed subterranean formation characteristics by transforming the received subterranean formation characteristics representing rock stress to a coordinate system;

calculating subterranean formation parameters using the transformed subterranean formation characteristics and the received subterranean formation characteristics;

applying a lithology-specific algorithm to the subterranean formation parameters to generate a failure criterion;

performing a borehole stability analysis using a simulation model, the failure criterion, and the received subterranean formation characteristics to determine the borehole stability index, further comprising:

determining an uncertainty range for the subterranean formation characteristics;

iterating through the uncertainty range of each subterranean formation characteristic of the subterranean formation characteristics, using a specified number of iteration steps and borehole operation factors, wherein the borehole stability analysis is performed at each iteration step; and combining the borehole stability analysis from each iteration step using an arithmetic algorithm to determine the borehole stability index, and an uncertainty range of the borehole stability index using the uncertainty range of each subterranean formation characteristic and the borehole operation factors; and modifying a mud pump using the borehole stability index and the uncertainty range of the borehole stability index to adjust operations of the mud pump or a mud weight.

* * * * *